(12) United States Patent
Park et al.

(10) Patent No.: US 10,609,289 B2
(45) Date of Patent: Mar. 31, 2020

(54) USER TERMINAL APPARATUS AND CONTROL METHOD THEREOF

(71) Applicant: Samsung Electronics Co., Ltd., Suwon-si, Gyeonggi-do (KR)

(72) Inventors: Hyun-sub Park, Suwon-si (KR); Dae-myung Kim, Hwaseong-si (KR); Dae-hyun Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/915,696

(22) Filed: Mar. 8, 2018

(65) Prior Publication Data

US 2018/0198987 A1    Jul. 12, 2018

Related U.S. Application Data

(63) Continuation of application No. 15/176,630, filed on Jun. 8, 2016, now Pat. No. 9,936,138.

(Continued)

(30) Foreign Application Priority Data

Jan. 6, 2016 (KR) .......................... 10-2016-0001684

(51) Int. Cl.
*G06F 1/16* (2006.01)
*H04N 5/232* (2006.01)

(52) U.S. Cl.
CPC ....... *H04N 5/23293* (2013.01); *G06F 1/1637* (2013.01); *G06F 1/1641* (2013.01);
(Continued)

(58) Field of Classification Search
CPC ......... H04M 2250/16; H04M 2250/52; H04M 2250/12; H04M 2250/22; H04M 1/0214;
(Continued)

(56) References Cited

U.S. PATENT DOCUMENTS 7,809,413 B2 * 10/2010 Sawayama ............ G06F 1/1616
348/14.01
7,835,775 B2 * 11/2010 Sawayama ............ G06F 1/1616
348/14.01

(Continued)

FOREIGN PATENT DOCUMENTS

JP       2012-114871 A    6/2012
KR   10-2011-0120858 A    11/2011
(Continued)

*Primary Examiner* — Michael S Osinski
(74) *Attorney, Agent, or Firm* — Jefferson IP Law, LLP

(57) ABSTRACT

A user terminal apparatus and a control method thereof are provided. The user terminal apparatus includes a display including a main display area which is disposed on a front surface of the user terminal apparatus, and a sub display area which extends from one side of the main display area and is disposed on at least one area of a rear surface of the user terminal apparatus, a camera configured to photograph an image, and a processor configured to display a live view acquired through the camera on one of the main display area or the sub display area, and control the display to display, in response to an orientation of the user terminal apparatus being changed, the live view on another one of the main display area or the sub display area.

25 Claims, 30 Drawing Sheets

Related U.S. Application Data

(60) Provisional application No. 62/198,360, filed on Jul. 29, 2015.

(52) U.S. Cl.
CPC .......... *G06F 1/1647* (2013.01); *G06F 1/1652* (2013.01); *H04N 5/23216* (2013.01); *H04N 5/23219* (2013.01); *H04N 5/23245* (2013.01); *H04M 2250/12* (2013.01); *H04M 2250/16* (2013.01)

(58) Field of Classification Search
CPC ............. H04M 1/0216; H04M 1/0241; H04M 1/0247; H04M 1/0266; H04M 1/0233; H04M 1/0268; H04M 1/0243; G06F 1/1647; G06F 1/1616; G06F 1/1677; G06F 1/1686; G06F 1/1641; G06F 1/165; G06F 1/1605; G06F 1/1618; G06F 1/1637; G06F 3/1423; H04N 5/23293; H04N 5/23216; H04N 5/23245; H04N 5/23219; H04N 5/2258
See application file for complete search history.

(56) References Cited

U.S. PATENT DOCUMENTS

| | | | |
|---|---|---|---|
| 8,391,697 B2 | 3/2013 | Cho et al. | |
| 8,405,571 B2 | 3/2013 | Chung | |
| 8,625,020 B2* | 1/2014 | Cheong | H04M 1/72522 348/333.02 |
| 8,810,627 B1 | 8/2014 | Cho et al. | |
| 8,836,842 B2 | 9/2014 | Sirpal et al. | |
| 9,124,713 B2 | 9/2015 | Park et al. | |
| 9,167,072 B2 | 10/2015 | Seo et al. | |
| 9,317,198 B2* | 4/2016 | Kwak | G06F 3/017 |
| 9,348,504 B2* | 5/2016 | Kwak | G06F 1/1616 |
| 9,639,177 B2* | 5/2017 | Kim | G06F 3/0346 |
| 9,933,819 B2* | 4/2018 | Kim | G06F 1/1652 |
| 10,001,846 B2* | 6/2018 | Kim | G06F 1/1626 |
| 2002/0142810 A1* | 10/2002 | Kawasaki | H04M 1/0214 455/566 |
| 2004/0014488 A1* | 1/2004 | Sawayama | G06F 1/1616 455/550.1 |
| 2005/0140574 A1* | 6/2005 | Tamura | G06F 1/1616 345/9 |
| 2005/0270396 A1* | 12/2005 | Miyashita | G02F 1/13452 348/333.01 |
| 2006/0119709 A1* | 6/2006 | Morimoto | H04N 5/23293 348/207.99 |
| 2007/0161416 A1* | 7/2007 | Sawayama | G06F 1/1616 455/575.3 |
| 2009/0011798 A1* | 1/2009 | Yamada | H04M 1/021 455/566 |
| 2009/0243958 A1 | 10/2009 | Matsumoto | |
| 2010/0026719 A1* | 2/2010 | Ozawa | G06F 3/0483 345/650 |
| 2010/0060664 A1* | 3/2010 | Kilpatrick, II | G06F 1/1616 345/650 |
| 2010/0117975 A1* | 5/2010 | Cho | G06F 1/1626 345/173 |
| 2011/0050975 A1* | 3/2011 | Chung | G06F 1/1624 348/333.02 |
| 2011/0065479 A1* | 3/2011 | Nader | G06F 1/1626 455/566 |
| 2011/0076003 A1* | 3/2011 | Cho | G03B 17/20 396/297 |
| 2011/0134269 A1 | 6/2011 | Kim | |
| 2012/0257096 A1* | 10/2012 | Gayer | G03B 17/20 348/333.01 |
| 2012/0280924 A1 | 11/2012 | Kummer et al. | |
| 2013/0044097 A1* | 2/2013 | Kim | G06F 1/1626 345/211 |
| 2013/0076929 A1 | 3/2013 | Sirpal et al. | |
| 2013/0100017 A1* | 4/2013 | Papakipos | H04L 12/1845 345/158 |
| 2013/0148002 A1* | 6/2013 | Kim | H04N 5/23293 348/333.08 |
| 2013/0235083 A1* | 9/2013 | Bao | G06F 3/1423 345/649 |
| 2013/0285906 A1* | 10/2013 | Jeon | G06F 3/017 345/158 |
| 2013/0300679 A1* | 11/2013 | Oh | A45C 11/00 345/173 |
| 2014/0055429 A1* | 2/2014 | Kwon | G09G 3/001 345/204 |
| 2014/0098197 A1* | 4/2014 | Geris | H04N 13/296 348/48 |
| 2014/0118256 A1* | 5/2014 | Sonoda | G06F 3/0346 345/158 |
| 2014/0184628 A1* | 7/2014 | Lee | G06F 3/1423 345/545 |
| 2014/0201653 A1 | 7/2014 | Han et al. | |
| 2014/0240543 A1* | 8/2014 | Kim | H04N 5/2258 348/231.99 |
| 2014/0285618 A1 | 9/2014 | Cho et al. | |
| 2014/0293000 A1* | 10/2014 | Ujiie | H04N 7/141 348/14.07 |
| 2014/0310643 A1 | 10/2014 | Karmanenko et al. | |
| 2014/0362257 A1* | 12/2014 | Viljamaa | H04N 5/2251 348/231.99 |
| 2015/0015741 A1* | 1/2015 | Kim | H04N 5/23293 348/239 |
| 2015/0062181 A1* | 3/2015 | Lee | G09G 5/38 345/659 |
| 2015/0098687 A1 | 4/2015 | Sabripour et al. | |
| 2015/0146349 A1 | 5/2015 | Choi et al. | |
| 2015/0193912 A1* | 7/2015 | Yuasa | G06F 3/14 345/659 |
| 2015/0221065 A1* | 8/2015 | Kim | G06T 3/40 345/660 |
| 2015/0244940 A1* | 8/2015 | Lombardi | H04N 5/23293 348/333.06 |
| 2015/0254044 A1 | 9/2015 | Cho et al. | |
| 2015/0294146 A1* | 10/2015 | Ogara | H04N 5/23293 348/333.06 |
| 2015/0301738 A1* | 10/2015 | Nishigaki | H04M 1/67 715/716 |
| 2015/0338888 A1* | 11/2015 | Kim | G06F 1/1677 345/156 |
| 2015/0378520 A1* | 12/2015 | Chandrasekaran | G06F 3/0482 715/716 |
| 2015/0378557 A1* | 12/2015 | Jeong | G06F 3/0488 715/835 |
| 2016/0004376 A1* | 1/2016 | Mitsunaga | G06F 1/1684 345/173 |
| 2016/0062648 A1* | 3/2016 | Jeong | G06F 3/04886 345/173 |
| 2016/0070305 A1* | 3/2016 | Kim | G06F 1/1652 345/173 |
| 2016/0085325 A1 | 3/2016 | Lee et al. | |
| 2016/0105542 A1* | 4/2016 | Lee | H04M 1/72597 455/566 |
| 2016/0124497 A1 | 5/2016 | Lee et al. | |
| 2016/0132074 A1* | 5/2016 | Kim | G06F 1/1652 715/769 |
| 2016/0198093 A1 | 7/2016 | Ito et al. | |
| 2016/0202869 A1* | 7/2016 | Kim | G06F 3/0488 715/841 |
| 2016/0232856 A1 | 8/2016 | Hidaka et al. | |
| 2016/0337595 A1* | 11/2016 | Kim | G06F 1/1677 |
| 2016/0357281 A1* | 12/2016 | Fleizach | H04N 3/155 |
| 2016/0364139 A1 | 12/2016 | Kim et al. | |
| 2016/0381014 A1 | 12/2016 | Kim | |
| 2017/0003756 A1* | 1/2017 | Gao | G06F 1/1641 |
| 2017/0003794 A1 | 1/2017 | Gao et al. | |
| 2017/0038915 A1 | 2/2017 | Choi et al. | |
| 2017/0094132 A1 | 3/2017 | Miyata | |
| 2017/0104855 A1 | 4/2017 | Lee et al. | |
| 2017/0154609 A1* | 6/2017 | Yoon | G06F 3/0412 |

(56) References Cited

U.S. PATENT DOCUMENTS

| | | | |
|---|---|---|---|
| 2017/0161006 A1 | 6/2017 | Kwon et al. | |
| 2017/0180646 A1* | 6/2017 | Kim | H04N 5/23219 |
| 2017/0199614 A1 | 7/2017 | Lee et al. | |
| 2017/0357399 A1* | 12/2017 | Lee | G06F 3/0485 |
| 2018/0059717 A1* | 3/2018 | Kim | G06F 1/1626 |
| 2018/0063434 A1* | 3/2018 | Seol | H04N 5/23245 |
| 2018/0109735 A1* | 4/2018 | Yamaguchi | G06T 7/90 |

FOREIGN PATENT DOCUMENTS

| | | |
|---|---|---|
| KR | 10-2014-0133187 A | 11/2014 |
| KR | 10-1497656 B1 | 2/2015 |
| KR | 10-1511117 B1 | 4/2015 |
| KR | 10-1512768 B1 | 4/2015 |

\* cited by examiner

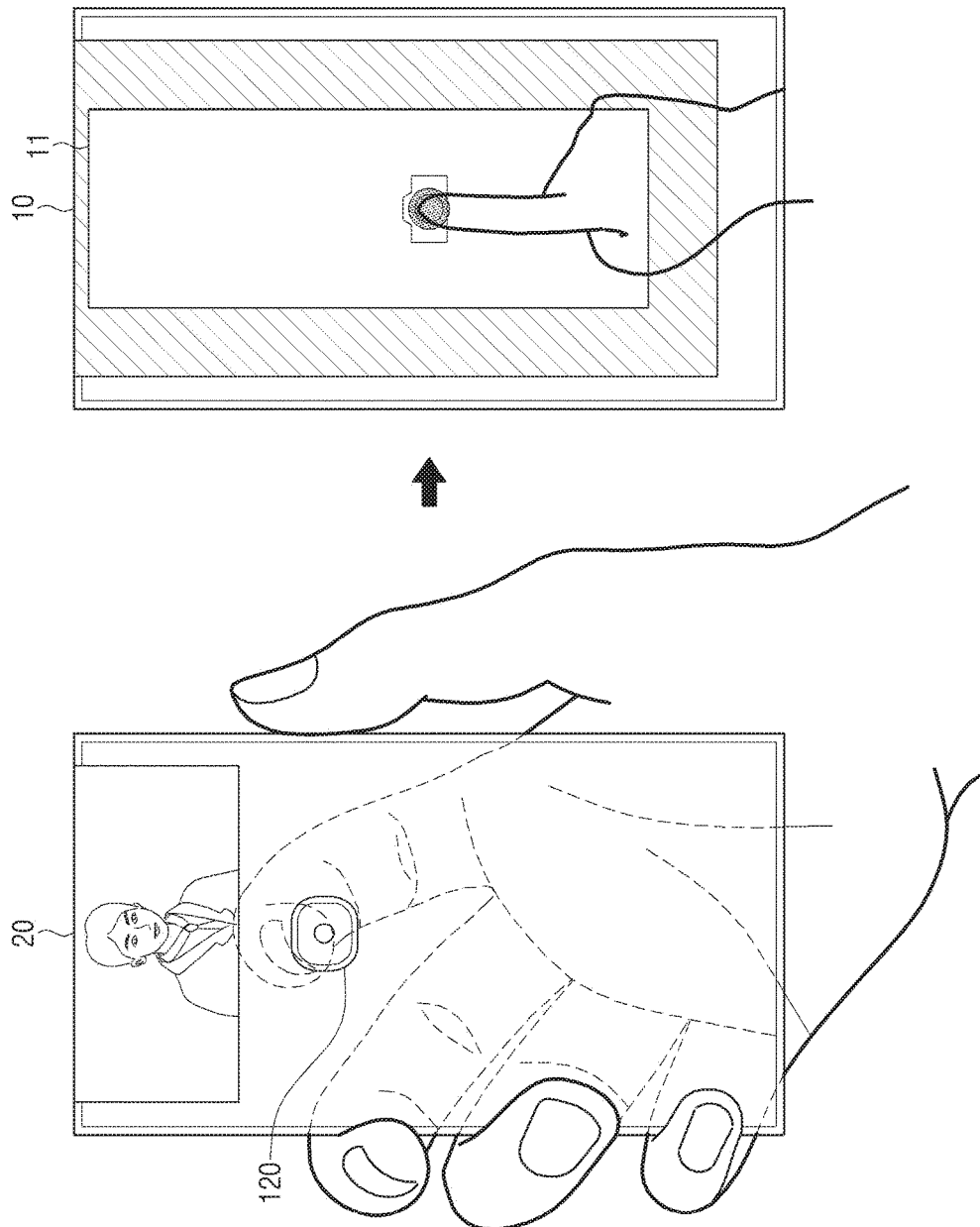

USER TERMINAL APPARATUS AND CONTROL METHOD THEREOF

CROSS-REFERENCE TO RELATED APPLICATION(S)

This application is a continuation application of prior application Ser. No. 15/176,630, filed on Jun. 8, 2016, which was based on and claimed priority under 35 U.S.C. § 119(e) of a U.S. Provisional application Ser. No. 62/198,360, filed on Jul. 29, 2015, in the U.S. Patent and Trademark Office, and under 35 U.S.C. § 119(a) of a Korean patent application number 10-2016-0001684, filed on Jan. 6, 2016, in the Korean Intellectual Property Office, the disclosure of which is incorporated by reference herein in its entirety.

TECHNICAL FIELD

The present disclosure relates to a user terminal apparatus and a control method thereof. More particularly, the present disclosure relates to a user terminal apparatus which uses displays disposed on the front surface and the rear surface of the user terminal apparatus when photographing, and a control method thereof.

BACKGROUND

Due to the development of electronic technology, various kinds of electronic devices are being used in various fields. In particular, an electronic device which has a display expanded to the rear surface thereof through out-bending (half round display) is being developed.

It is common that a camera is provided on the rear surface of the electronic device. As a display is provided on the rear surface of the electronic device, selfie photographing may be easily performed. In addition, even when the electronic device is provided with a single camera, a user may photograph while checking a photography state using the rear display.

Accordingly, there is a demand for a method of ensuring availability of a rear display when a photographing function is used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal apparatus which controls displays disposed on the front surface and the rear surface of the user terminal apparatus based on a photographing situation, and a control method thereof.

In accordance with an aspect of the present disclosure, a user terminal apparatus is provided. The user terminal apparatus includes a display including a main display area which is disposed on a front surface of the user terminal apparatus, and a sub display area which extends from one side of the main display area and is disposed on at least one area of a rear surface of the user terminal apparatus, a camera configured to photograph an image, and a processor configured to display a live view acquired through the camera on one of the main display area or the sub display area, and control the display to display, in response to an orientation of the user terminal apparatus being changed, co the live view on another one of the main display area or the sub display area.

In accordance with another aspect of the present disclosure, a control method of a user terminal apparatus is provided. The control method includes a display including a main display area which is disposed on a front surface of the user terminal apparatus, and a sub display area which extends from one side of the main display area and is disposed on at least one area of a rear surface of the user terminal apparatus, and a camera configured to photograph an image which includes displaying a live view acquired through the camera on one of the main display area or the sub display area and displaying, in response to an orientation of the user terminal apparatus being changed, the live view on another one of the main display area or the sub display area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B illustrate an example of a method for executing a specific function through a main display area according to various embodiments of the present disclosure;

Throughout the drawings, like reference numerals will be understood to refer to like parts, components, and structures.

DETAILED DESCRIPTION

Figure 1A:
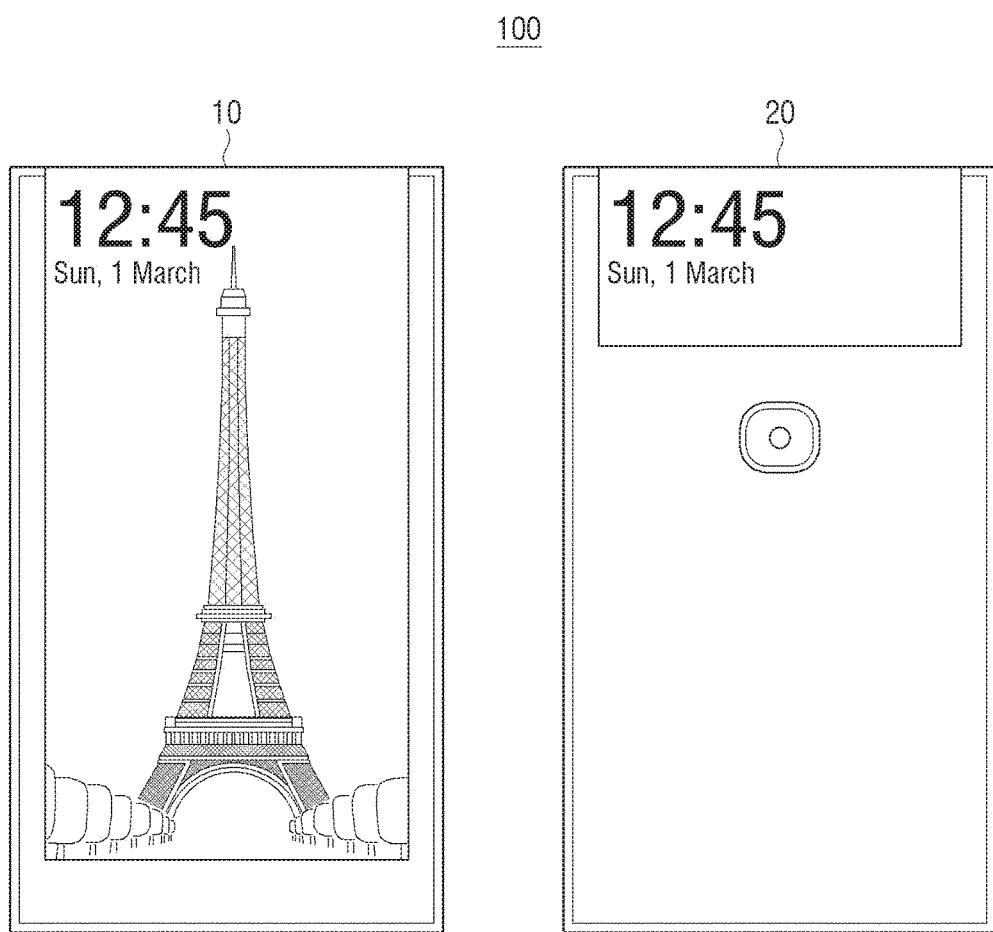
FIGS. 1A and 1B are views to illustrate an example of a configuration of a display of a user terminal apparatus according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms such as "first" and "second" used in various embodiments are used to distinguish various elements from one another regardless of an order or importance of the corresponding elements. Accordingly, the order or importance of the elements is not limited by these terms. For example, a first element may be named a second element without departing from the scope of right of various embodiments of the present invention, and similarly, a second element may be named a first element.

It will be understood that, when an element (e.g., a first element) is "(operatively or communicatively) coupled with/to" or "connected to" another element (e.g., a second element), the element may be directly coupled with/to another element, and there may be an intervening element (e.g., a third element) between the element and the other element. To the contrary, it will be understood that, when an element (e.g., a first element) is "directly coupled with/to" or "directly connected to" another element (e.g., a second element), there is no intervening element (e.g., a third element) between the element and the other element.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments. According to circumstances, even the terms defined in the embodiments should not be interpreted as excluding the embodiments of the present disclosure.

Various embodiments will be explained in detail with reference to the accompanying drawings.

Figure 1B:
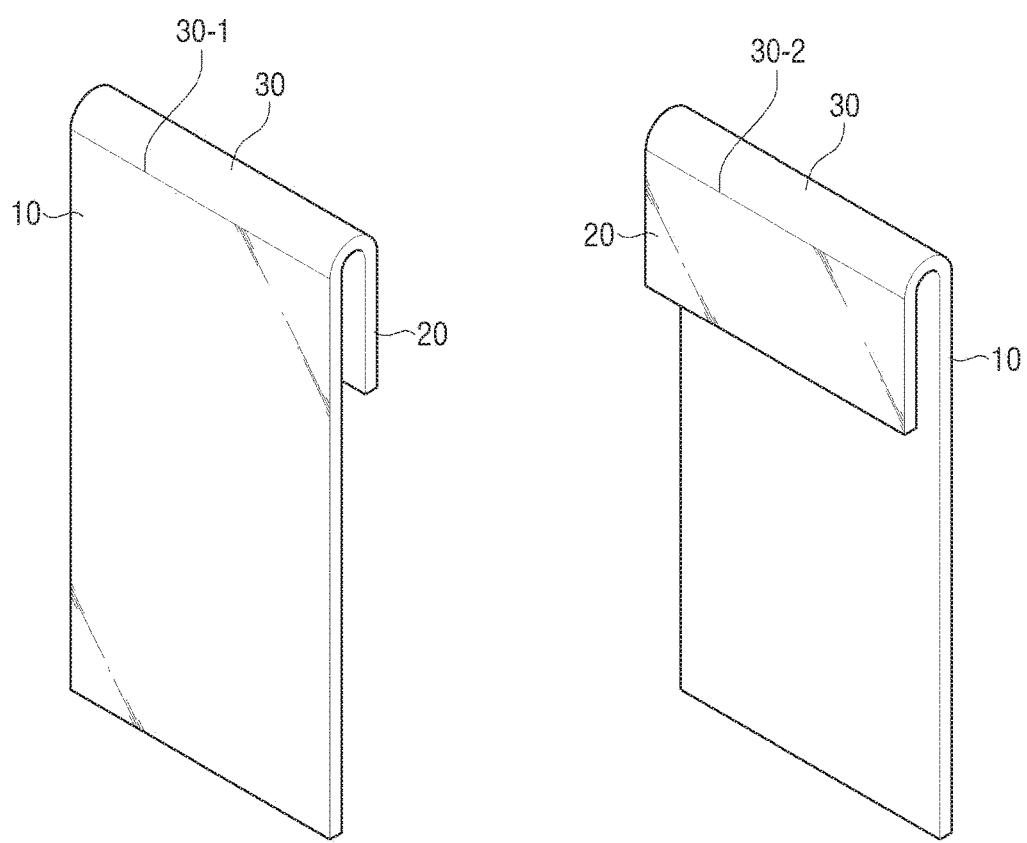

FIGS. 1A and 1B are views to illustrate an example of a configuration of a display of a user terminal apparatus according to various embodiments of the present disclosure.

Referring to FIG. 1A, the left view shows the front surface of a user terminal apparatus 100, and the right view shows the rear surface of the user terminal apparatus 100. A front display is disposed on the front surface of the user terminal apparatus 100, and a rear display and a camera are disposed on the rear surface of the user terminal apparatus 100. The front display and the rear display may be connected with each other, and the rear display may be smaller than the front display. However, this should not be considered as limiting, and the front display and the rear display may have the same size. In addition, the camera may be disposed on the front surface of the user terminal apparatus 100. The front display will be explained as a main display area 10 and the rear display will be explained as a sub display area 20.

Referring to FIG. 1B, the left view is a front view showing the entire display in which the main display area 10, the sub display area 20, and a round display area 30 are connected with one another, and the right view is a rear view of the entire display.

The sub display area 20 may extend from one side of the main display area 10 and may be disposed on at least one area of the rear surface of the user terminal apparatus 100. In particular, the sub display area 20 may extend from the top of the main display area 10 to be bent. The bent area may have a curved shape, but is not limited to this and may form an angle according to the type of the display.

The round display area 30 is an area for connecting the main display area 10 and the sub display area 20. As described above, the round display area 30 may have a curved shape or an angular shape. The round display area 30 may be distinguished from the main display area 10 and the sub display area 20 by boundary lines 30-1, 30-2.

The boundary lines 30-1, 30-2 shown in FIG. 1B are merely an example and may be changed. In addition, the boundary lines 30-1, 30-2 may be determined by a manufacturer at the time of manufacturing, and may be changed by a user. In response to the boundary lines 30-1, 30-2 being changed, the sizes of the main display area 10, the sub display area 20, and the round display area 30 may be changed and the size of a content displayed on each area may be changed.

In FIGS. 1A and 1B, the display encloses the upper side of the user terminal apparatus 100. However, the display may enclose any one of the lower side, the left side surface, and the right side surface of the user terminal apparatus 100. In addition, the display may enclose a plurality of side surface other than a single side surface.

The display may enclose a touch pad, and the display and the touch pad may be implemented in the form of a touch screen by forming a mutual layer structure. In this case, the touch pad is also bent similarly to the display and thus a touch input may be inputted opposite to what the user thinks. For example, it may be determined that there is a difference in the touch area but the touch is made in the same direction in response to the user dragging from a certain point of the main display area 10 to an upper point and in response to the user dragging from a certain point of the sub display area 20 to an upper point. However, since the touch pad is bent, the touch pad may receive the input in the opposite direction to the real input in response to the user dragging from a certain point of the main display area 10 to an upper point and in response to the user dragging from a certain point of the sub display area 20 to an upper point. Therefore, the user terminal apparatus 100 may be set to recognize the direction of a touch input at a certain area as the opposite direction. This departs from the scope of the present disclosure and thus a detailed description thereof is omitted.

Since the main display area 10, the sub display area 20, and the round display area 30 are connected with one another, various sensors and a receiver may be provided on the side surface or lower portion of the user terminal apparatus 100. In particular, a directional receiver may be provided. Alternatively, the receiver may be provided on an integral cover which may interwork with the user terminal apparatus 100. In response to the receiver being provided on the lower portion, a processor 130 may reverse the top and bottom of an image and display the image while the user is talking on the phone.

First, the present disclosure will be explained on the assumption that the sub display area 20 has a structure extending from the main display area 10 through the round display area 30 of the curved shape, and the camera is disposed on the rear surface of the user terminal apparatus 100. Additionally, various embodiments will be expanded and described when the display has other configurations and the location of the camera is changed.

In addition, the direction of the main display area 10 and the sub display area 20 going toward the round display area 30 will be explained as being upward from the user terminal apparatus 100, and the opposite direction will be explained as being downward. The left side and the right side will be explained with reference to a display area which is viewed by the user. Accordingly, the left side and the right side when the user views the main display area 10 are reversed when the user views the sub display area 20.

Figure 2A:
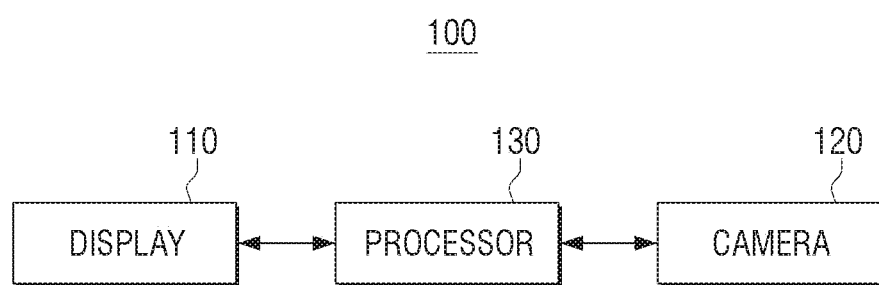
FIG. 2A is a block diagram illustrating a configuration of a user terminal apparatus according to an embodiment of the present disclosure.

FIG. 2A is a block diagram illustrates a configuration of a user terminal apparatus according to an embodiment of the present disclosure.

Referring to FIG. 2A, a user terminal apparatus 100 includes a display 110, a camera 120, and a processor 130.

FIG. 2A illustrates overall elements of the user terminal apparatus 100 when the user terminal apparatus 100 is provided with various functions such as a display function, a control function, and the like. Accordingly, some of the elements shown in FIG. 2A may be omitted or changed and other elements may be added according to an embodiment.

The display 110 may include a main display area 10 which is disposed on the front surface of the user terminal apparatus 100, a sub display area 20 which extends from one side of the main display area 10 and is disposed on at least one area of the rear surface of the user terminal apparatus 100, and a round display area 30 for connecting the main display area 10 and the sub display area 20. However, this should not be considering as limiting. For example, the sub display area 20 may be configured to enclose the entire rear surface of the user terminal apparatus 100.

The terms "front surface" and "rear surface" are used for convenience of explanation and are not limited by the meaning thereof. For example, the front surface and the rear surface may refer to one side surface and the other side surface regarding a specific electronic device. In the above-described explanation, the display 110 extends from one side of the main display area 10. However, this should not be considered as limiting. For example, the display 110 may extend from all side surfaces of the main display area 10 and cover the entire user terminal apparatus 100.

The sub display area 20 of the display 110 may extend from the upper side of the main display area 10 to be bent and may be disposed on the upper area of the rear surface. For example, a connection part between the main display area 10 and the sub display area 20 may be formed in the shape of "U" and have a curved line when the main display area 10 and the sub display area 20 are viewed from the side. However, this should not be considered as limiting. The connection part between the main display area 10 and the sub display area 20 may be formed in the shape of a squared "C" and have an angle of 90° when the main display area 10 and the sub display area 20 are viewed from the side. In addition, various connection parts may be formed based on the type of the user terminal apparatus 100.

The display 110 may display various user interfaces (UIs) under the control of the processor 130. For example, the display 110 may display a live view, a gallery application, an animation, and the like.

The display 110 may display different contents on the main display area 10, the sub display area 20, and the round display area 30 under the control of the controller 130. For example, the display 110 may display a moving picture on the main display area 10, an image on the sub display area 20, and a UI for transmitting a message on the round display area 30.

In addition, the display 110 may display a content by interlocking at least two of the main display area 10, the sub display area 20, and the round display area 30. For example, the display 110 may display a moving picture on the main display area 10 and display a UI for controlling the moving picture on the sub display area 20. In addition, the display 110 may display a UI for providing a function unrelated to the moving picture on the round display area 30.

In addition, the display 110 may display the same content on at least two of the main display area 10, the sub display area 20, and the round display area 30. For example, the display 110 may display the same content on the main display area 10 and the sub display area 20 and may display a separate content on the round display area 30.

The display 110 may be implemented by using a liquid crystal display (LCD) panel, an organic light emitting diodes (OLED) display, a plasma display panel (PDP), and the like, but is not limited to these. In addition, the display 110 may be implemented by using a transparent display, a flexible display, and the like, according to circumstances.

The camera 120 is configured to photograph a still image or a moving picture under the control of the user. The camera 120 may photograph a still image at a specific time or may continuously photograph a still image. The camera 120 provides the acquired image to the display 110, and a live view may be displayed on at least one of the main display area 10 and the sub display area 20. The camera 120 may photograph the user or a background image according to the orientation of the user terminal apparatus 100. The camera 120 may include a plurality of cameras such as a front camera and a rear camera.

The camera 120 includes a lens, a shutter, an aperture, a solid state imaging device, an analog front end (AFE), and a timing generator (TG). The shutter adjusts a time at which light reflected from a subject enters the user terminal apparatus 100, and the aperture adjusts an amount of light entering the lens by mechanically increasing or reducing the size of an opening through which light enters. The solid state imaging device outputs an image generated by photo-charge as an electric signal when the light reflected from the subject accumulates as photo-charge. The TG outputs a timing signal to read out pixel data of the solid state imaging device, and the AFE samples and digitizes the electric signal outputted from the solid state imaging device.

The processor 130 may control the overall operation of the user terminal apparatus 100.

The processor 130 may control to display a live view acquired through the camera 120 on one of the main display area 10 and the sub display area 20, and display the live view on the other one of the main display area 10 and the sub display area 20 in response to the orientation of the user terminal apparatus 100 being changed. The processor 130 may determine whether the orientation of the user terminal apparatus 100 is changed using a gravity sensor, an acceleration sensor, a gyro sensor, and the like. In addition, the processor 130 may determine whether the orientation of the user terminal apparatus 100 is changed by analyzing the live view acquired by the camera 120. However, this should not be considered as limiting. The processor 130 may change the area to display the live view by moving or shaking in a specific direction, in addition by changing the orientation of the user terminal apparatus 100.

The processor 130 may display the live view and additionally may display a guide line. In addition, the processor 130 may display a graphical UI (GUI) for executing a gallery application, a GUI for executing an image correction application, and the like, in addition to a GUI for photographing.

The processor 130 may display the live view on the main display area 10 and may not provide information on the sub display area 20. In response to the orientation of the user terminal apparatus 100 changing, the processor 130 may display the live view on the sub display area 20 and may not provide information on the main display area 10. The information may not be provided in various ways. For example, power may not be supplied to the display 110 or black is displayed on the display 110.

The processor 130 may activate a touch function of the main display area 10 while displaying the live view on the sub display area 20 without providing information on the main display area 10. In response to detecting a user touch from the main display area 10, the processor 130 may photograph and store an image.

In response to detecting a swipe interaction from a certain point in the main display area 10 in a predetermined direction, the processor 130 may change a photographing setting value to correspond to the predetermined direction.

The processor 130 may display the live view on the main display area 10, and, in response to recognizing the live view as including a person's face, the processor 130 may control the display 110 to display the face area included in the live view on the sub display area 20.

The processor 130 may crop a part of the live view to correspond to the size of the sub display area 20 and control the display 110 to display the cropped part on the sub display area 20.

In addition, the processor 130 may display the live view on the main display area 10, and, in response to recognizing the live view as including a person, the processor 130 may control the display 110 to display an animation on the sub display area 20.

The processor 130 may determine a distance to a subject, and, in response to determining the distance is shorter than a predetermined distance, the processor 130 may control the display 110 to display the live view on the sub display area 20, and, in response to determining the distance is longer than the predetermined distance, control the display 110 to display the live view on the main display area 10.

The user terminal apparatus 100 may further include a plurality of sensors, and the processor 130 may determine whether the orientation of the user terminal apparatus 100 is changed based on at least one of a location and a motion of the user terminal apparatus 100 and a user's grip detected by the plurality of sensors.

In addition, in response to determining a person's face is greater than or equal to a predetermined size being recognized in the live view or in response to determining the person's face is greater than or equal to the predetermined size being recognized, but not recognizing the person's face afterward, the processor 130 may determine that the orientation of the user terminal apparatus 100 is changed.

Figure 2B:
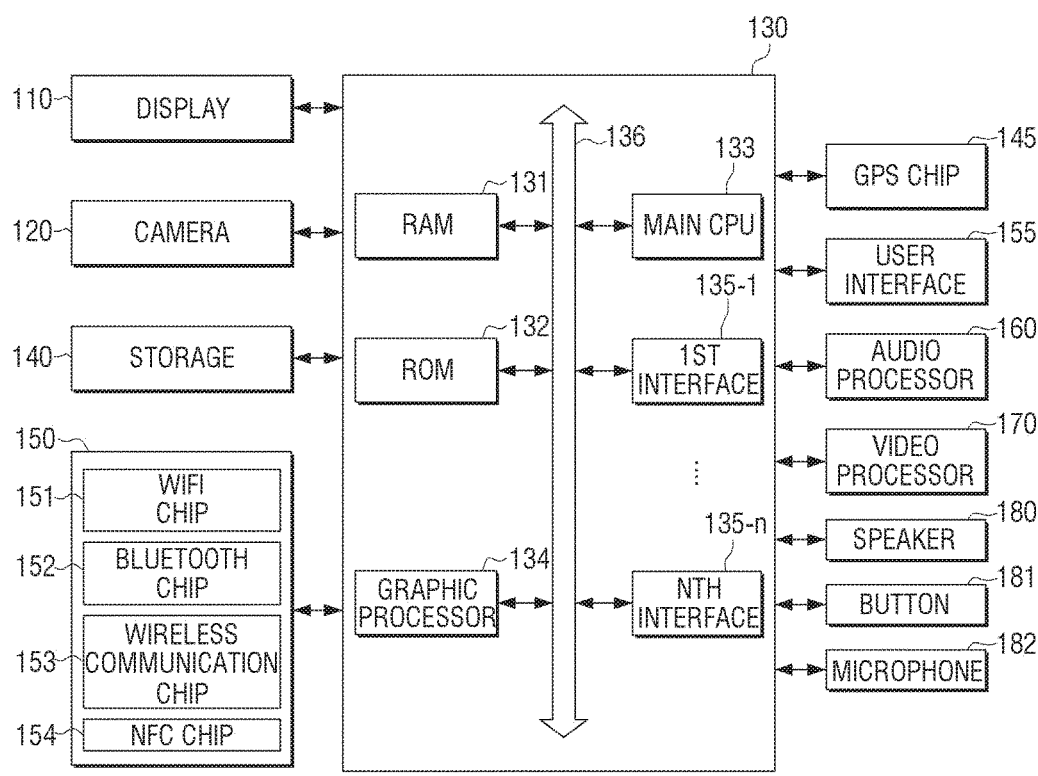
FIG. 2B is a block diagram illustrating an example of a detailed configuration of a user terminal apparatus according to an embodiment of the present disclosure.

FIG. 2B is a block diagram illustrating an example of a detailed configuration of a user terminal apparatus according to an embodiment of the present disclosure.

Referring to FIG. 2B, a user terminal apparatus 100 includes a display 110, a camera 120, a processor 130, a global positioning system (GPS) chip 145, a storage 140, a sensor, a communicator 150, a user interface 155, an audio processor 160, a video processor 170, a speaker 180, a button 181, and a microphone 182. The same elements of FIG. 2B as in FIG. 2A will not be described in detail.

The display 110 may be divided into the main display area 10, the sub display area 20, and the round display area 30 as described above. The display 110 may be implemented by using various types of displays such as an LCD, an OLED display, a PDP, and the like. The display 110 may further include a driving circuit which is implemented by using an amorphous silicon thin film transistor (a-si TFT), a low temperature poly silicon (LTPS) TFT, an organic TFT (OTFT), and the like, and a backlight unit. The display 110 may be combined with a touch sensor included in the sensor and may be implemented as a touch screen.

In this case, the touch sensor may include at least one of a touch panel and a pen recognition panel. The touch panel may detect a user's finger gesture input and output a touch event value corresponding to a detected touch signal. The touch panel may be mounted under at least one of the main display area 10, the sub display area 20, and the round display area 30 of the display 110.

The touch panel may detect the user's finger gesture input in a capacitive method or a resistive method. The capacitive method calculates touch coordinates by detecting minute electricity excited in a user's body. The resistive method includes two electrode plates embedded in the touch panel, and calculates touch coordinates by detecting an electric current flowing due to contact between upper and lower plates at a touched point.

The pen recognition panel may detect a user's pen gesture input according to a user's operation of using a touch pen (e.g., a stylus pen, a digitizer pen), and output a pen proximity event value or a pen touch event value. The pen recognition panel may be mounted under at least one of the main display area 10, the sub display area 20, and the round display area 30 of the display 110.

The pen recognition panel may be implemented in an electromagnetic resonance (EMR) method, for example, and may detect a touch or a proximity input according to a change in the intensity of an electromagnetic field caused by the proximity or touch of the pen. Specifically, the pen recognition panel may include an electromagnetic induction coil sensor (not shown) having a grid structure, and an electronic signal processor (not shown) which provides an alternating current (AC) signal having a predetermined frequency to each loop coil of the electromagnetic induction coil sensor in sequence. In response to a pen having a resonant circuit embedded therein existing in the proximity of the loop coil of the pen recognition panel, a magnetic field transmitted from the corresponding loop coil generates a current in the resonant circuit of the pen based on the mutual electromagnetic induction. Based on the current, an induction magnetic field is generated from the coil forming the resonant circuit in the pen, and the pen recognition panel detects the induction magnetic field from the loop coil in a signal reception state, and thus detects the proximity location or touch location of the pen.

The pen recognition panel may be configured differently according to a display area. For example, both the touch panel and the pen recognition panel may be provided in the main display area 10, and only the touch panel may be provided in the sub display area 20 and the round display area 30.

The processor 130 may deactivate a specific panel by shutting off the power to the specific panel. In addition, the processor 130 may supply power to the touch panel and the pen recognition panel and receive a touch or a pen input, but may deactivate a specific panel by disregarding an input to the specific panel in a software level.

In this case, the processor 130 may receive at least one of a hand touch and a pen touch according to whether the touch panel and the pen recognition panel of the main display area 10 are activated. For example, the processor 130 may activate only the touch panel not to receive the pen touch input and receive only the hand touch input or may activate only the pen recognition panel not to receive the hand touch input and receive only the pen touch input.

In addition, the touch panel and the pen recognition panel may be provided on the entire display area and the pen recognition panel of some areas may be deactivated. For example, the processor 130 may deactivate only the pen recognition panel corresponding to the sub display area 20 and the round display area 30.

The touch panel and the pen recognition panel may be implemented as a single panel. In this case, the processor 130 may detect a touch input and a pen input through the entire display area.

In response to the touch panel and the pen recognition panel being implemented as a single panel, the processor 130 may perform an operation corresponding to an input based on at least one of an input type and an input area. For example, the processor 130 may disregard a specific input such as a pen input in a software level. In addition, the processor 130 may disregard a pen input to the sub display area 20 in a software level.

The processor 130 may control the overall operations of the user terminal apparatus 100 using various programs stored in the storage 140.

Specifically, the processor 130 may include a random access memory (RAM) 131, a read only memory (ROM) 132, a main central processing unit (CPU) 133, a graphic processor 134, first to n-th interfaces 135-1 to 135-n, and a bus 136.

The RAM 131, the ROM 132, the main CPU 133, the graphic processor 134, and the first to n-th interfaces 135-1 to 135-n may be connected with one another via the bus 136.

The first to n-th interfaces 135-1 to 135-n may be connected with the above-described various elements. One of the interfaces may be a network interface which is connected with an external device via a network.

The main CPU 133 may access the storage 140 and perform booting using an operating system (O/S) stored in the storage 140. In addition, the main CPU 133 may perform various operations using various programs stored in the storage 140.

The ROM 132 may store a set of instructions for booting a system. In response to a turn on command being inputted and power being supplied, the main CPU 133 may copy the O/S stored in the storage 140 into the RAM 131 according to a command stored in the ROM 132, and boot the system by executing the O/S. In response to the booting being completed, the main CPU 133 may copy various application programs stored in the storage 140 into the RAM 131, and perform various operations by executing the application programs copied into the RAM 131.

The graphic processor 134 may generate a screen including various objects such as an icon, an image, a text, and the like, using a calculator (not shown) and a renderer (not shown). The calculator (not shown) may calculate attribute values of objects to be displayed according to a layout of the screen, such as a coordinate value, a shape, a size, a color, and the like, based on a received control command. The renderer (not shown) may generate the screen of various layouts including objects based on the attribute values calculated by the calculator (not shown). The screen generated by the renderer (not shown) may be displayed in the display area of the display 110.

The above-described operations of the processor 130 may be achieved by a program stored in the storage 140.

The storage 140 may store a variety of data such as an O/S software module for driving the user terminal apparatus 100, a photographing module, and an application module.

In this case, the processor 130 may process and display an input image based on information stored in the storage 140.

The GPS chip 145 is an element for receiving a GPS signal from a GPS satellite, and calculating a current location of the user terminal apparatus 100. In response to a navigation program being used or a user's current location being required, the processor 130 may calculate the user's location using the GPS chip 145.

The communicator 150 is configured to communicate with various kinds of external devices according to various kinds of communication methods. The communicator 150 includes a Wi-Fi chip 151, a Bluetooth chip 152, a wireless communication chip 153, and a near field communication (NFC) chip 154. The processor 130 may communicate with various external devices using the communicator 150.

In particular, the Wi-Fi chip 151 and the Bluetooth chip 152 communicate in a Wi-Fi method and a Bluetooth method, respectively. When the Wi-Fi chip 151 or the Bluetooth chip 152 is used, a variety of connection information such as a service set identifier (SSID) and a session key may be exchanged first, and communication may be established using the connection information, and then a variety of information may be exchanged. The wireless communication chip 153 refers to a chip which communicates according to various communication standards such as The Institute of Electrical and Electronics Engineers (IEEE), ZigBee, 3rd generation (3G), 3G partnership project (3GPP), long term evolution (LTE), and the like. The NFC chip 154 refers to a chip which operates in an NFC method using a band of 13.56 MHz from among various radio frequency identification (RF-ID) frequency bands such as 135 kHz, 13.56 MHz, 433 MHz, 860-960 MHz, and 2.45 GHz.

The communicator 150 may perform unidirectional communication or bidirectional communication with an electronic device. When the communicator 150 performs the unidirectional communication, the communicator 150 may receive signals from the electronic device. When the communicator 150 performs the bidirectional communication, the communicator 150 may receive signals from the electronic device or transmit signals to the electronic device.

The user interface 155 may receive various types of user interaction. When the user terminal apparatus 100 is implemented by using a touch-based portable terminal, the user interface 155 may be implemented in the form of a touch screen forming a mutual layer structure with a touch pad. In this case, the user interface 155 may be used as the above-described display 110.

The sensor (not shown) may include a touch sensor, a geomagnetic sensor, a gyro sensor, an acceleration sensor, a proximity sensor, a grip sensor, and the like. The sensor may detect various operations such as rotation, tilt, pressure, approach, grip, and the like. in addition to the above-described touch.

The touch sensor may be implemented in a capacitive method or a resistive method. The capacitive type touch sensor is a sensor which calculates touch coordinates by detecting minute electricity excited in a user's body when a part of the user's body touches the surface of the display, using a dielectric substance coated on the surface of the display. The resistive type touch sensor includes two electrode plates embedded in the user terminal apparatus 100, and, when the user touches the screen, calculates touch coordinates by detecting an electric current flowing due to contact between upper and lower plates at the touched point. In addition, infrared beam, surface acoustic wave, integral strain gauge, piezo electric, and the like, may be used to detect a touch interaction.

In addition, the user terminal apparatus 100 may determine whether a touch object such as a finger or a stylus pen touches or approaches using a magnetic field sensor, an optical sensor, a proximity sensor, and the like, instead of the touch sensor.

The geomagnetic sensor is a sensor for detecting a rotational state, a moving direction, and the like, of the user terminal apparatus 100. The gyro sensor is a sensor for detecting a rotational angle of the user terminal apparatus 100. Both the geomagnetic sensor and the gyro sensor may be provided, but, even when only one of them is provided, the user terminal apparatus 100 may detect a rotation state.

The acceleration sensor is a sensor for detecting how the user terminal apparatus 100 is tilted.

The proximity sensor is a sensor for detecting a motion which approaches without directly contacting the display surface. The proximity sensor may be implemented by using various types of sensors such as a high-frequency oscillation type proximity sensor which forms a high frequency magnetic field and detects an electric current induced by a magnetic characteristic which is changed when an object approaches, a magnetic type proximity sensor which uses a magnet, and a capacitive type proximity sensor which detects capacitance that changes when an object approaches, and the like.

The grip sensor may be disposed on the rear surface, edge, or handle part separately from the touch sensor provided on the touch screen, and detects a user's grip. The grip sensor may be implemented as a pressure sensor in addition to the touch sensor.

The audio processor 160 is an element for processing audio data. The audio processor 160 may perform various processing operations such as decoding, amplification, noise filtering, and the like, with respect to the audio data.

The video processor 170 is an element for processing video data. The video processor 170 may perform various image processing operations such as decoding, scaling, noise filtering, frame rate conversion, resolution conversion, and the like, with respect to the video data.

The speaker 180 is an element for outputting not only various audio data processed by the audio processor 160 but also various notification sounds, voice messages, and the like.

The button 181 may include various types of buttons such as a mechanical button, a touch pad, a wheel, and the like, formed on a certain area of the user terminal apparatus 100, such as the front surface, the side surface, and the rear surface of the body exterior of the user terminal apparatus 100.

The microphone 182 is an element for receiving an input of a user voice or other sounds and converting the user voice or sound into audio data.

Although not shown in FIG. 2B, the user terminal apparatus 100 may further include a universal serial bus (USB) port to which a USB connector is connected, a headset, a mouse, various external input ports for connecting to various external ports such as a local area network (LAN), a digital multimedia broadcasting (DMB) chip for receiving and processing a DMB signal, various sensors, and the like.

Figure 2C:
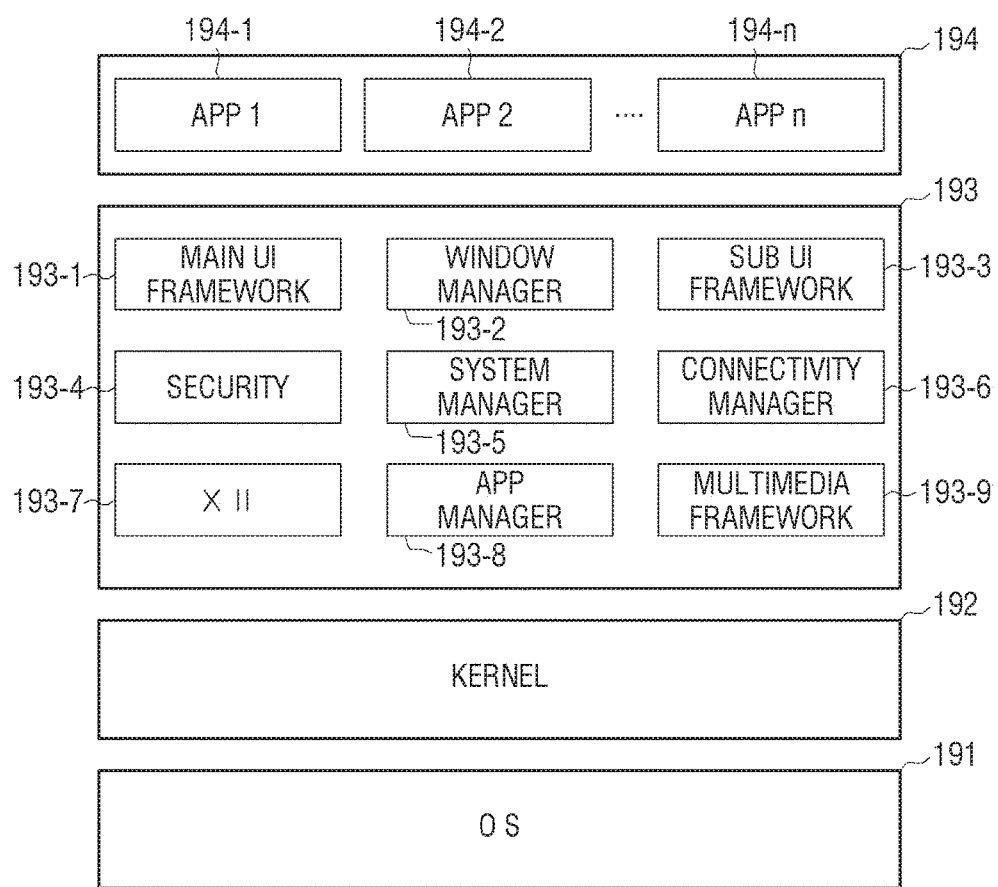
FIG. 2C illustrates various modules stored in a storage according to an embodiment of the present disclosure.

FIG. 2C illustrates various modules stored in a storage according to an embodiment of the present disclosure.

The software of FIG. 2C may be stored in the storage 140, but is not limited to this. The software may be stored in various kinds of storing means used in the user terminal apparatus 100.

Referring to FIG. 2C, software including an O/S 191, a kernel 192, middleware 193, an application 194, and the like may be stored in the user terminal apparatus 100.

The O/S 191 controls and manages the overall operations of hardware. That is, the O/S 191 is a software layer which is responsible for basic functions such as hardware management, memory management, and security.

The kernel 192 serves as a channel to transmit various signals including a touch signal, and the like, detected by the display 110 to the middleware 193.

The middleware 193 includes various software modules to control the operations of the user terminal apparatus 100. Referring to FIG. 2C, the middleware 193 includes a main UI framework 193-1, a window manager 193-2, a sub UI framework 193-3, a security module 193-4, a system manager 193-5, a connectivity manager 193-6, an X11 module 193-7, an APP manager 193-8, and a multimedia framework 193-9.

The main UI framework 193-1 is a module which provides various UIs to be displayed on the main display area 10 of the display 110, and the sub UI framework 193-3 is a module which provides various UIs to be displayed on the sub display area 20. The main UI framework 193-1 and the sub UI framework 193-3 may include an image compositor module to configure various objects, a coordinates compositor module to calculate coordinates for displaying the objects, a rendering module to render the configured objects on the calculated coordinates, a two dimensional (2D)/three dimensional (3D) UI toolkit to provide a tool for configuring a UI in the form of 2D or 3D.

The window manager 193-2 may detect a touch event using a user's body or a pen or other input events. In response to such an event being detected, the window manager 193-2 transmits an event signal to the main UI framework 193-1 or the sub UI framework 193-3 such that an operation corresponding to the event is performed.

In addition, various program modules such as a writing module which, when the user touches and drags on the screen, draws a line following the trace of the dragging, and an angle calculation module which calculates a pitch angle, a roll angle, a yaw angle, and the like, based on a sensor value detected by the sensor, may be stored.

The security module 193-4 is a module which supports certification, permission, and secure storage for hardware.

The system manager 193-5 monitors the states of the elements in the user terminal apparatus 100, and provides the result of the monitoring to the other modules. For example, in response to a battery life level being low, an error being generated, or communication being disconnected, the system manager 193-5 provides the result of the monitoring to the main UI framework 183-1 or the sub UI framework 193-3 to output a notification message or a notification sound.

The connectivity manager 193-6 is a module which supports wire or wireless network connection. The connectivity manager 193-6 may include various sub modules such as a DNET module, a universal plug and play (UPnP) module, and the like.

The X11 module 193-7 is a module which receives various event signals from a variety of hardware provided in the user terminal apparatus 100. The event recited herein refers to an event in which a user operation is detected, an event in which a system alarm is generated, an event in which a specific program is executed or ends, and the like.

The APP manager 193-8 is a module which manages the execution states of various applications installed in the storage 140. In response to an event in which an application execution command is inputted being detected by the X11 module 193-7, the APP manager 193-8 may call and execute an application corresponding to the event. That is, in response to an event in which at least one object is selected being detected, the APP manager 193-8 may call an application corresponding to the object and execute the application.

The multimedia framework 193-9 is a module which reproduces multimedia contents which are stored in the user terminal apparatus 100 or provided from external sources. The multimedia framework 193-9 may include a player module, a camcorder module, a sound processing module, and the like. Accordingly, the multimedia framework 193-9 may reproduce various multimedia contents, generate a screen and a sound, and reproduce the same.

The software structure shown in FIG. 2C is merely an example and is not limited to this. Therefore, some of the elements may be omitted or changed or an element may be added when necessary. For example, the storage 140 may be additionally provided with various programs such as a sensing module to analyze signals sensed by various sensors, a messaging module such as a messenger program, a short message service (SMS) and multimedia message service (MMS) program, and an email program, a call information aggregator program module, a voice over internet protocol (VoIP) module, a web browser module, and the like.

As described above, the user terminal apparatus 100 may be implemented by using various kinds of devices such as a mobile phone, a tablet personal computer (PC), a laptop PC, a personal digital assistant (PDA), a Moving Picture Experts Group phase 1 or phase 2 (MPEG-1 or MPEG-2) audio layer 3 (MP3) player, an electronic album device, a television (TV), a PC, a kiosk, and the like. Accordingly, the elements described in FIGS. 2B and 2C may be changed in various ways according to the type of the user terminal apparatus 100.

As described above, the user terminal apparatus 100 may be implemented in various shapes and configurations.

Hereinafter, a basic configuration and various embodiments will be explained for easy understanding of the present disclosure.

Figure 3:
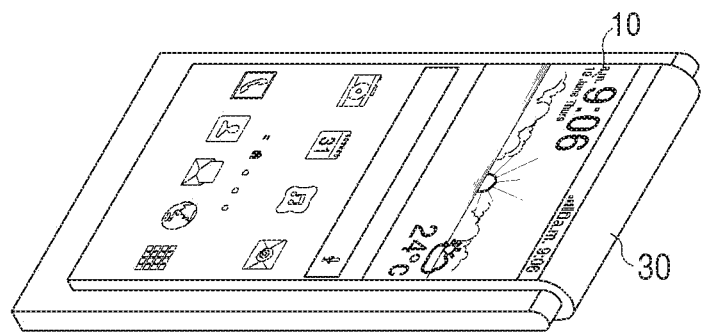
FIG. 3 illustrates an example of using one of a main display area, a sub display area, and a round display area according to an embodiment of the present disclosure.
Figure 3:
Figure 3:
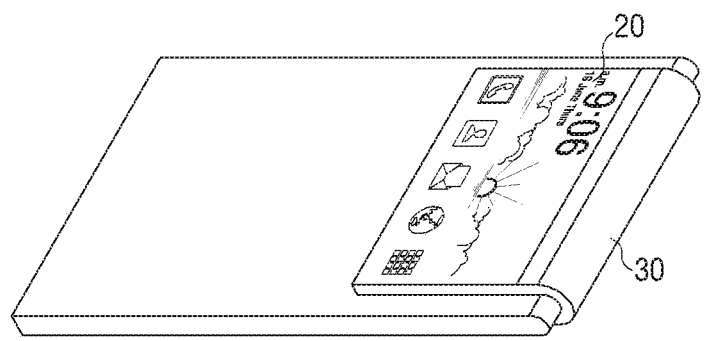

FIG. 3 illustrates an example of using only one of a main display area, a sub display area, and a round display area according to an embodiment of the present disclosure.

Referring to FIG. 3, the processor 130 may determine an area to provide information based on the orientation of the user terminal apparatus 100. In response to the processor 130 providing information to one area, the processor 130 may not provide information to the other two areas.

In response to a user input pressing a power button, the processor 130 may determine the area to provide information. In addition, in response to a call or a text message being received, the processor 130 may determine the area to provide information.

In the above-described example, the processor 130 determines the area to provide information based on the orientation of the user terminal apparatus 100. However, this should not be considered as limiting. For example, in response to a user input pressing the power button, the processor 130 may recognize the user and provide information through an area which is close to the user's eyes. In this case, the provided information may vary according to an executed application The processor 130 may change the display area to provide information through a user's touch input to the area which no information is provided. For example, in response to a user input continuing touching on a certain area of the sub display area 20 being received while the information is provided to the main display area 10, the processor 130 may display the information provided to the main display area 10 on the sub display area 20.

The processor 130 may display the same information in different ways according to the area to display the information. For example, the processor 130 may change the layout of a home screen according to the display area as shown in FIG. 3.

In response to the orientation of the user terminal apparatus 100 being changed, the processor 130 may change the area to display information. For example, in response to the user terminal apparatus 100 being rotated by more than a predetermined angle while the home screen is being displayed on the main display area 10, the processor 130 may display the home screen on the sub display area 20.

In particular, in response to the orientation of the user terminal apparatus 100 being changed and thus the display area being changed, the processor 130 may change the layout of information to be provided. In response to the area to provide information being changed, the processor 130 may change not only an object but also the size, content, and layout of the object.

In response to the orientation of the user terminal apparatus 100 being changed and thus the display area being changed, the processor 130 may change the operation state of an application which is being executed and provide the application to another display area. In addition, in response to the orientation of the user terminal apparatus 100 being changed, the processor 130 may divide displayed information and display divided pieces of information on the other display areas.

Figure 4:
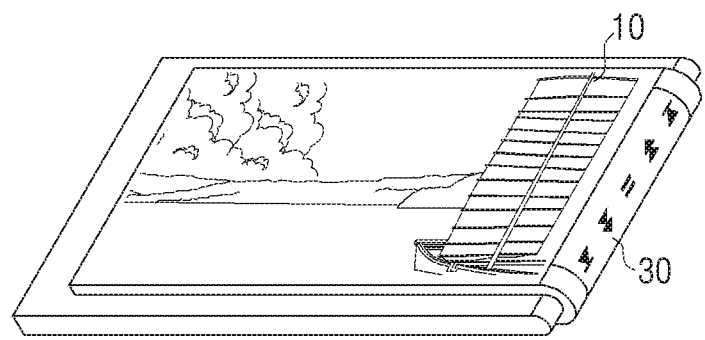
FIG. 4 illustrates an example of using at least two of a main display area, a sub display area, and a round display area according to an embodiment of the present disclosure.

FIG. 4 illustrates an example of using at least two areas of a main display area, a sub display area, and a round display area according to an embodiment of the present disclosure.

Referring to FIG. 4, the processor 130 may provide pieces of information related to each other to two areas of the main display area 10, the sub display area 20, and the round display area 30. For example, the processor 130 may display a moving picture on the main display area 10 and may display a UI for controlling the moving picture on the round display area 30.

However, this should not be considered as limiting. The processor 130 may provide pieces of information unrelated to each other to two areas of the main display area 10, the sub display area 20, and the round display area 30.

In addition, in response to a call being received while the UI for controlling the moving picture is displayed on the round display area 30 as shown in FIG. 4, the processor 130 may display a call reception UI on the round display area 30, and move the UI for controlling the moving picture to the sub display area 20 and display the UI on the sub display area 20.

In response to the call being connected by touching the call reception UI, the processor 130 may display a telephone call UI on the round display area 30 and continue reproducing the moving picture. In this case, the processor 130 may mute the moving picture. In addition, the processor 130 may pause the moving picture.

The processor 130 may provide pieces of information related to each other using all of the main display area 10, the sub display area 20, and the round display area 30. For example, the processor 130 may display a moving picture on the main display area 10, display a UI for controlling the moving picture on the sub display area 20, and display a UI showing a moving picture reproduction time on the round display area 30.

In addition, the processor 130 may provide pieces of information unrelated to each other using all of the main display area 10, the sub display area 20, and the round display area 30. In addition, the processor 130 may provide pieces of information related to each other to two areas of the main display area 10, the sub display area 20, and the round display area 30, and provide information unrelated to the aforementioned information to the other area.

In response to the orientation of the user terminal apparatus 100 being changed, the processor 130 may change the display area of information displayed on each area. In particular, the processor 130 may change the display area by combining or dividing information displayed on each area.

In response to a touch input on the sub display area 20 being received, the processor 130 may display a UI displayed on the sub display area 20 on the main display area 10. In addition, in response to a touch input on the main display area 10 being received, the processor 130 may display a UI displayed on the main display area 10 on at least one of the sub display area 20 and the round display area 30.

Even in response to the same user touch input being detected, the processor 130 may differently adjust a setting value according to a touch area. For example, in response to a drag operation being inputted to the main display area 10 or the sub display area 20 while a moving picture is being displayed on the main display area 10, the processor 130 may adjust a reproduction time or a volume according to the direction of the drag operation. In this case, in response to the drag operation on the sub display area 20, the processor 130 may adjust the reproduction time or volume more minutely than in response to the drag operation on the main display area 10.

FIG. 4 is merely an embodiment and this should not be considered as limiting. For example, the main display area 10, the sub display area 20, and the round display area 30 of FIG. 4 may be replaced with one another. In addition, the operations described in FIG. 4 may be applied to any other applications.

Figure 5:
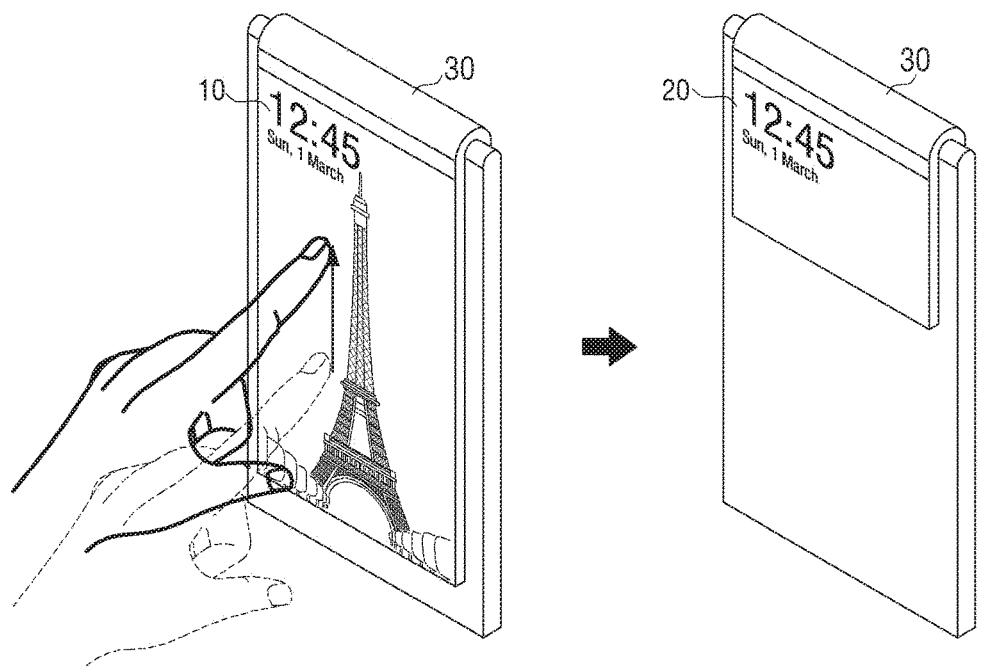
FIG. 5 illustrates respective areas and an example of an operation corresponding to a touch input according to an embodiment of the present disclosure.

FIG. 5 illustrates respective areas and an example of an operation corresponding to a touch input according to an embodiment of the present disclosure.

Referring to FIG. 5, in response to a drag input going from a certain area of the main display area 10 to the round display area 30 being received, the processor 130 may display information provided on the main display area 10 on the sub display area 20.

Only in response to a drag input going longer than a predetermined length being received, the processor 130 may display the information provided on the main display area 10 on the sub display area 20.

In response to there being information provided on the sub display area 20 before the drag input is received, the processor 130 does not provide the information provided on the sub display area 20 any longer. In addition, the processor 130 may display the information provided on the sub display area 20 on the main display area 10 or the round display area 30.

In FIG. 5, only the main display area 10 and the sub display area 20 are used. However, this should not be considered as limiting. For example, the processor 130 may display information provided on at least one of the main display area 10 and the sub display area 20 on the round display area 30. In addition, the processor 130 may display information provided on the round display area 30 on at least one of the main display area 10 and the sub display area 20.

Although information is not provided on a specific area, the processor 130 may receive a touch input. For example, in response to a user dragging input on the round display area 30 being received while a broadcast content is being displayed on the main display area 10, the processor 130 may change a channel or a volume of the broadcast content. In this case, no information may be provided on the round display area 30.

Figure 6:
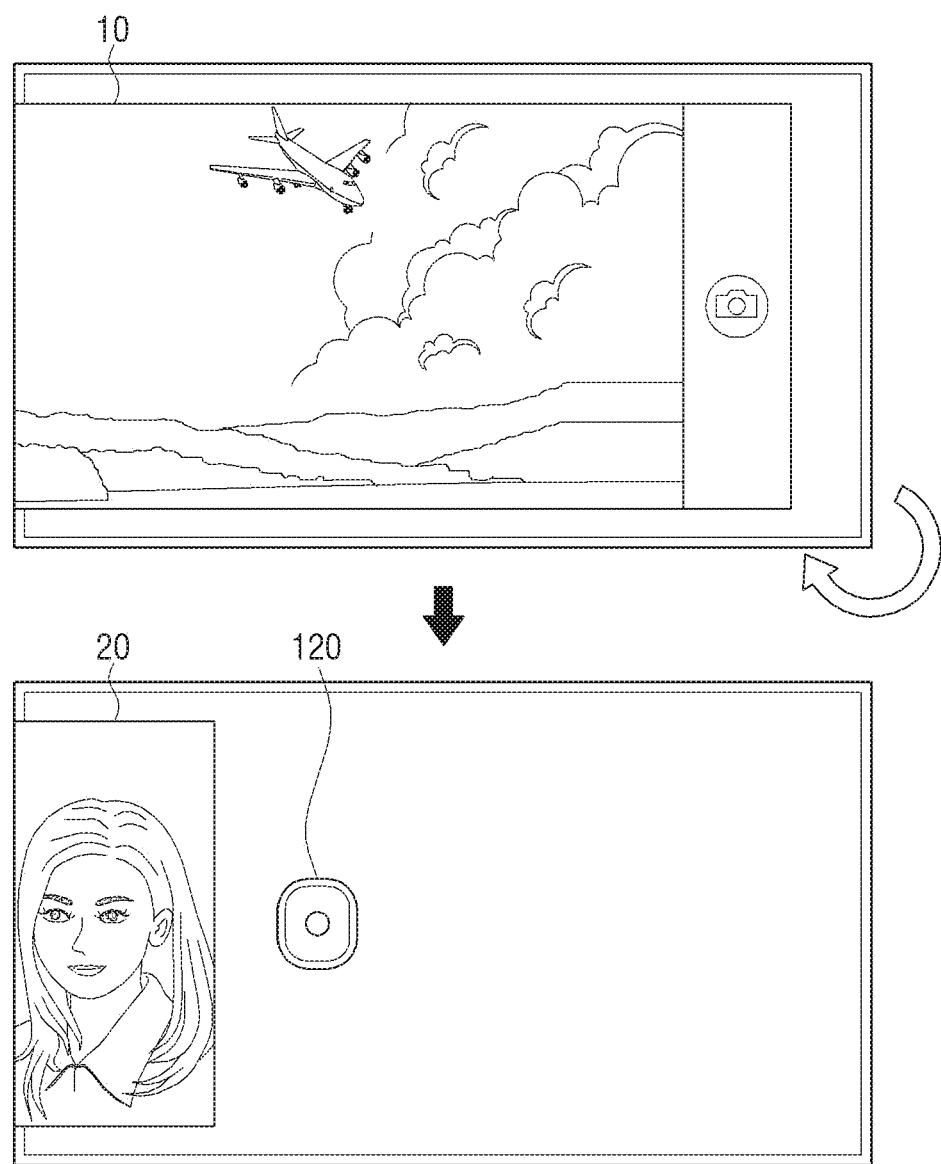
FIG. 6 illustrates an operation in response to the orientation of the user terminal apparatus being changed according to an embodiment of the present disclosure.

FIG. 6 illustrates an operation in response to the orientation of a user terminal apparatus being changed according to an embodiment of the present disclosure.

Referring to FIG. 6, the user terminal apparatus 100 includes a display 110, which includes a main display area 10 which is disposed on the front surface of the user terminal apparatus 100, a sub display area 20 which extends from one side of the main display area 10 and is disposed on at least one area of the rear surface of the user terminal apparatus 100, and a round display area 30 for connecting the main display area 10 and the sub display area 20.

The user terminal apparatus 100 may be provided with a camera 120 disposed on the rear surface thereof to photograph. The structure of the user terminal apparatus 100 having the camera 120 disposed on the rear surface thereof will be explained first for convenience of explanation. The structure of the user terminal apparatus 100 having the camera 120 disposed on the front surface thereof will be explained thereafter.

The processor 130 may display a live view which is acquired through the camera 110 on one of the main display area 10 and the sub display area 20. The upper view of FIG. 6 illustrates that the processor 130 displays a live view on the main display area 10. In addition, the processor 130 may display the live view on the sub display area 20, and a method for determining which of the main display area 10 and the sub display area 20 is the area to display the live view will be explained below.

In response to the orientation of the user terminal apparatus 100 being changed, the processor 130 may control the display 110 to display the live view on the other one of the main display area 10 and the sub display area 20. The lower view of FIG. 6 illustrates that, in response to a rotation by more than a predetermined angle in a specific direction being detected while the live view is being displayed on the main display area 10, the processor 130 displays the live view on the sub display area 20. The image photographed by the camera 120 may also be changed in response to the orientation of the user terminal apparatus 100 being changed. The processor 130 may determine that the orientation of the user terminal apparatus 100 is changed in various methods, and a detailed description thereof will be explained below.

In response to the orientation of the user terminal apparatus 100 being changed and thus the area to display the live view being changed, the processor 130 may display a soft key, a control GUI, and the like, to correspond to the corresponding area. For example, in response to the live view being displayed on the main display area 10, the processor 130 may display a GUI for photographing on the right side of the main display area 10. In addition, in response to the orientation of the user terminal apparatus 100 being changed and thus the live view being displayed on the sub display area 20, the processor 130 may not display the GUI for photographing and may photograph in response to a touch on the sub display area 20.

In response to the orientation of the user terminal apparatus 100 being changed while the live view is being displayed on the sub display area 20, the processor 130 may display a photographing setting value on the main display area 10.

The processor 130 may display the live view on the main display area 10 and may not provide information on the sub display area 20, and, in response to the orientation of the user terminal apparatus 100 being changed, the processor 130 may display the live view on the sub display area 20 and may not provide information on the main display area 10. For example, in the case of the upper view of FIG. 6, the processor 130 may not provide information on the sub display area 20. In addition, in the case of the lower view of FIG. 6, the processor 130 may not provide information on the main display area 10. However, this should not be considered as limiting. The processor 130 may display the live view on both the main display area 10 and the sub display area 20.

The processor 130 may not provide information by displaying one of the main display area 10 and the sub display area 20 in black. In addition, the processor 130 may not supply power to the display 110 of one of the main display area 10 and the sub display area 20. Although the processor 130 may not provide information on one of the main display area 10 and the sub display area 20, the processor 130 may activate a touch function to receive a touch input.

In response to the orientation of the user terminal apparatus 100 being changed, the processor 130 may change a photographing mode. For example, in response to the orientation of the user terminal apparatus 100 being changed and thus a subject being recognized as being close to the user terminal apparatus 100, the processor 130 may convert a current mode into a selfie photographing mode. The selfie photographing mode is a mode optimized to selfie photographing and may correct user's skin automatically.

In addition, in response to the orientation of the user terminal apparatus 100 being changed and thus a subject being recognized as being far from the user terminal apparatus 100, the processor 130 may convert a current mode into a background photographing mode. The background photographing mode is a mode optimized to scene photographing and may adjust contrast and white balance automatically.

The processor 130 may change an angle of view according to a photographing mode. For example, the processor 130 may narrow the angle of view in the selfie photographing mode and may widen the angle of view in the background photographing mode.

In addition, the processor 130 may change a UI provided on the display according to a photographing mode. For example, the processor 130 may provide a UI including a function of correcting user's skin and a function of reducing a red-eye effect in the selfie photographing mode, and may provide a UI including a contrast adjustment function and a white balance adjustment function in the background photographing mode.

Figure 7A:
FIGS. 7A and 7B illustrate an example of a method for changing a provided image according to a display area according to various embodiments of the present disclosure.
Figure 7B:
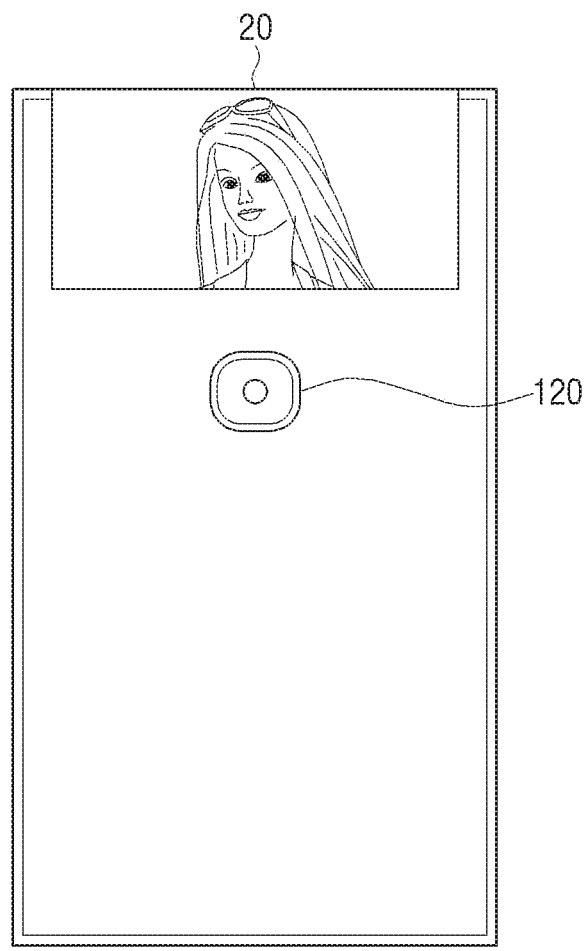

FIGS. 7A and 7B illustrate an example of a method of changing a provided image according to a display area according to various embodiments of the present disclosure.

Referring to FIG. 7A, the processor 130 may display a live view on the main display area 10. In response to the user doing a photographing manipulation, the processor 130 may store the same image as the image displayed on the main display area 10.

In addition, referring to FIG. 7B, the processor 130 may display the live view on the sub display area 20. In this case, the processor 130 may display only a part of the image which is recognized through the camera 120.

FIGS. 7A and 7B illustrate that the same subject is photographed for convenience of explanation. That is, the processor 130 may photograph the image shown in FIG. 7A, but may display only a part of the photographed image on the sub display area 20 as shown in FIG. 7B.

However, this is merely an embodiment, and the processor 130 may rotate the photographed entire image by 90° and display the image on the sub display area 20.

In addition, even in response to photographing being performed while the live view is being displayed on the sub display area 20, the processor 130 may store the entire image. For example, even in response to the user performing selfie photographing with the composition shown in FIG. 7B, the processor 130 may photograph an original image including not only the user's face but also the user's upper body as shown in FIG. 7A.

In this case, a gallery application may be executed and the processor 130 may display the stored image differently according to a display area. For example, in response to the image being displayed on the main display 10, the processor 130 may display the original image including the user's upper body. In response to the image being displayed on the sub display area 20, the processor 130 may display a partial image including only the user's face.

The processor 130 may store both the original image and the partial image. In addition, the processor 130 may store only the original image, and may crop the image to correspond to the sub display area 20 when necessary and display the image on the sub display area 20. In this case, the original image may store information on a part to be cropped.

Figure 8B:
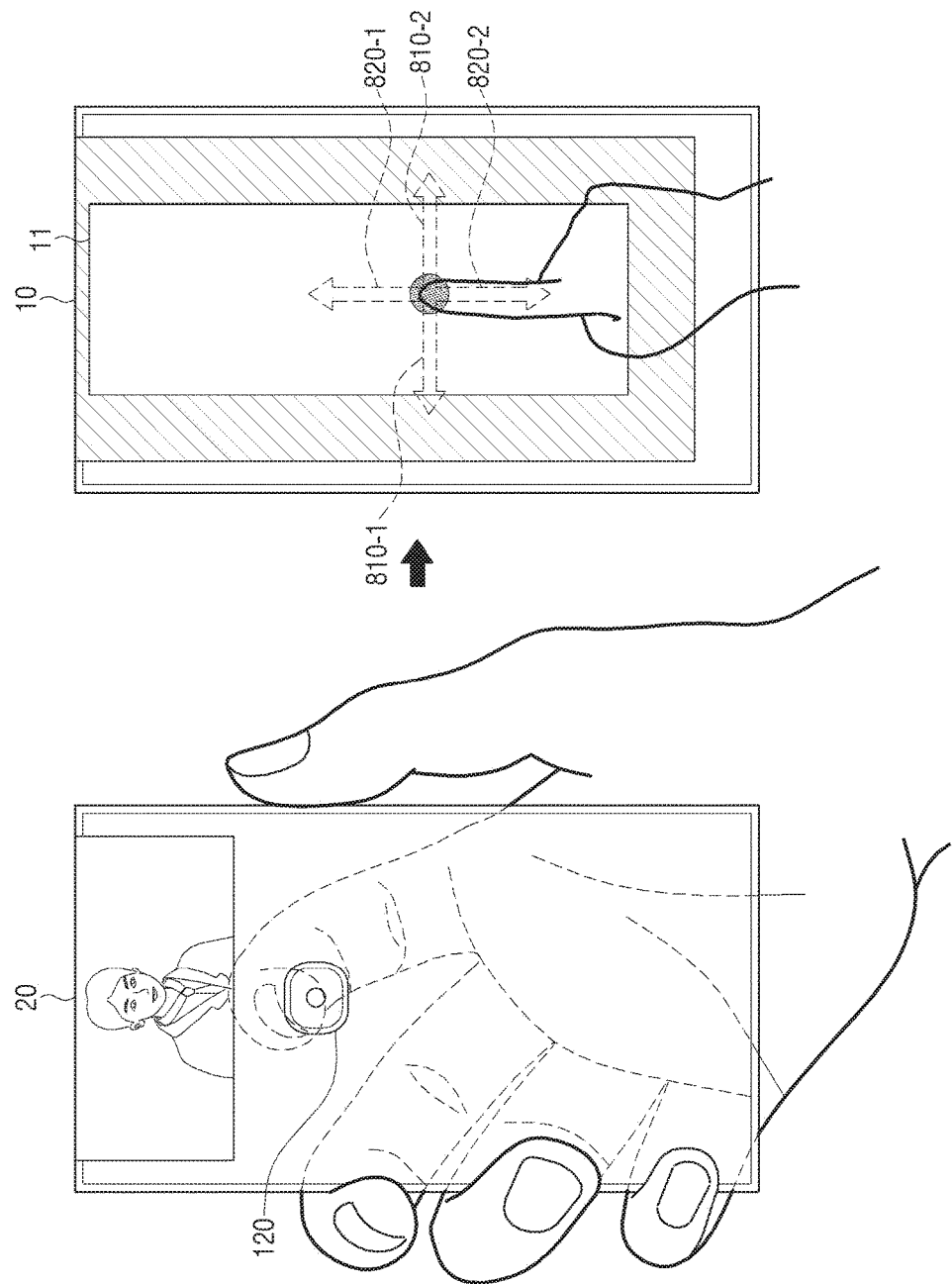

FIGS. 8A and 8B illustrate an example of a method of executing a specific function through a main display area according to various embodiments of the present disclosure. The processor 130 may display a live view on the sub display area 20 and may not provide information on the main display area 10. In this case, the processor 130 may execute a corresponding function according to a user touch input on the main display area 10.

Referring to FIG. 8A, photographing an image using the main display area 10 is illustrated. For example, the processor 130 may display a live view on the sub display area 20 and may not provide information on the main display area 10. In this case, in response to a user touch on the main display area 10 being detected, the processor 130 may photograph and store an image.

The processor 130 may photograph the image only in response to a user touch on a predetermined area 11 of the main display area 10 being detected. The predetermined area 11 may be set by the manufacturer or may be set by the user. In this case, the processor 130 may activate a touch function of the predetermined area 11 of the main display area 10 and may deactivate a touch function of the other area of the main display area 10.

Referring to FIG. 8B, changing a photographing setting value using the main display area 10 is illustrated. For example, the processor 130 may display a live view on the sub display area 20 and may not provide information on the main display area 10. In this case, in response to a swipe interaction from a certain point in the main display area 10 in a predetermined direction being detected, the processor 130 may change a photographing setting value to correspond to the predetermined direction.

The processor 130 may change the photographing setting value only in response to a swipe interaction from a certain point in the predetermined area 11 of the main display area 10 in a predetermined direction being detected. The predetermined area may be set by the manufacturer or may be set by the user. In this case, the processor 130 may activate the touch function of the predetermined area 10 of the main display area 10 and deactivate the touch function of the other area of the main display area 10.

In response to a swipe interaction in the horizontal direction 810-1, 810-2 being detected, the processor 130 may change an exposure value and display the live view. In response to a swipe interaction in the vertical direction 820-1, 820-2 being detected, the processor 130 may display the live view while zooming in or zooming out. However, this should not be considered as limiting. The processor 130 may change a focus or change white balance through the swipe interaction.

In FIGS. 8A and 8B, only the predetermined area 11 of the main display area 10 has been described. However, this should not be considered as limiting. For example, the processor 130 may activate the touch function of the entire main display area 10, and photograph in response to a user touch on a certain point of the main display area 10 being detected. In addition, the processor 130 may divide the main display area 10 into a plurality of predetermined areas, and may allocate different functions to the predetermined areas.

The processor 130 may execute corresponding functions in response to various interactions, such as a drag and drop interaction, a multi-touch interaction, and a stretch interaction which refers to pinching out, in addition to the touch and the swipe interaction. The interactions and corresponding functions thereof may be set by the manufacturer or may be set by the user.

In FIGS. 8A and 8B, the processor 130 executes a specific function in response to a touch on the main display area 10. However, this should not be considered as limiting. For example, the processor 130 may display a live view on the main display area 10 and may not provide information on the sub display area 20. In this state, in response to a user touch on the sub display area 20 being detected, the processor 130 may photograph and store an image. In addition, in response to a swipe interaction from a certain point in the sub display area 20 in a predetermined direction being detected, the processor 130 may change the photographing setting value to correspond to the predetermined direction.

In addition, the processor 130 may display the live view on both the main display area 10 and the sub display area 20, and may use the area on the opposite side to the area which is viewed by the user as an area to receive a touch input.

In FIGS. 8A and 8B, only the case in which the camera 120 is used has been described. However, in response to another application being used, the processor 130 may receive a touch input using the area on the opposite side to the area which is viewed by the. For example, while displaying a broadcast content on the main display area 10, the processor 130 may change a channel or a volume through a swipe interaction on the sub display area 20.

In addition, in FIGS. 8A and 8B, only the main display area 10 and the sub display area 20 are used. However, one of the main display area 10 and the sub display area 20 and the round display area 30 may be used. For example, while displaying a live view on the sub display area 20, the processor 130 may photograph according to a user touch input on the round display area 30.

Figure 9:
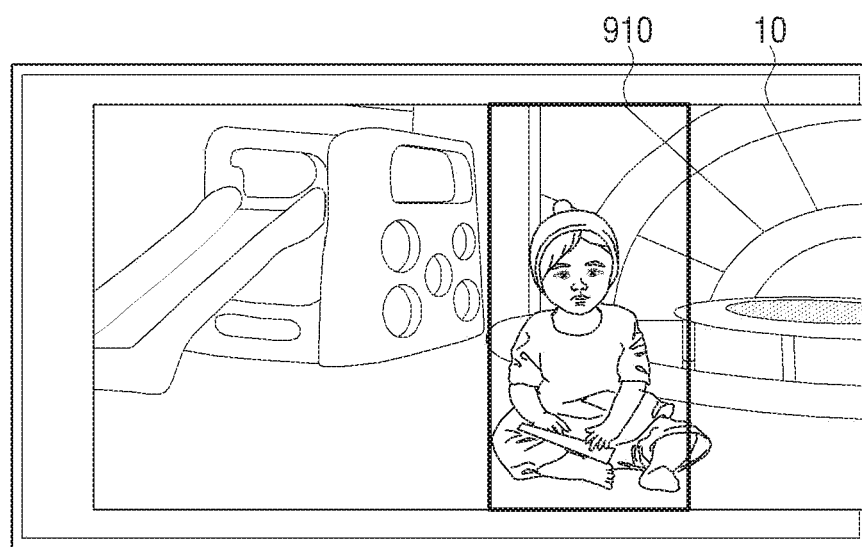
FIG. 9 illustrates a method for displaying a live view on both a main display area and a sub display area according to an embodiment of the present disclosure.
Figure 9:
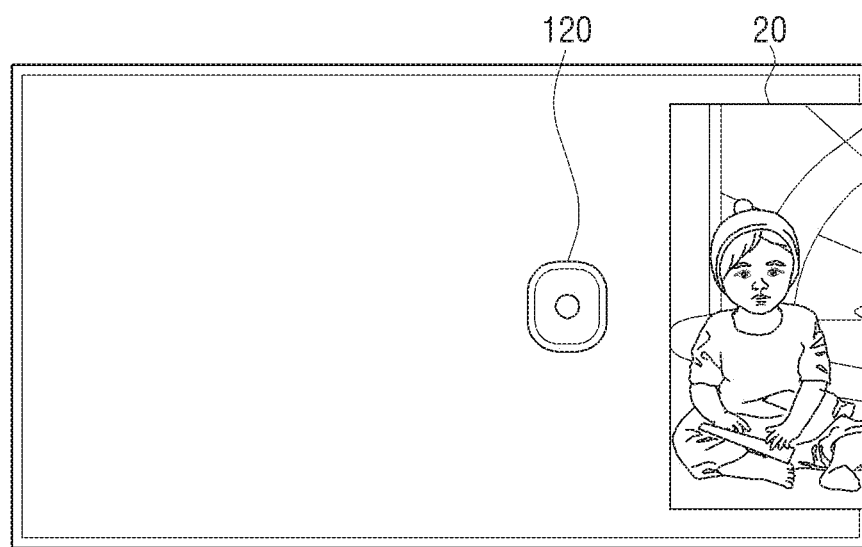

FIG. 9 illustrates a method of displaying a live view on both a main display area and a sub display area according to an embodiment of the present disclosure.

Referring to FIG. 9, the processor 130 may display a live view on the main display area 10, and, in response to the live view being recognized as including a person's face, the processor 130 may control the display 110 to display a face area included in the live view on the sub display area 20. For example, in response to the user terminal apparatus being far from a subject, the processor 130 may display the live view on the main display area 10. This will be explained in detail below.

The processor 130 may recognize a user's face from the live view displayed on the main display area 10. To recognize the person's face using the live view, the processor 130 may divide a specific still image of the live view into a plurality of pixel blocks, and calculates a representative pixel value from each of the pixel blocks. The representative pixel value may be calculated based on an average of all pixels included in the pixel block or may be calculated based on a maximum distribution value, a median value, or a maximum value. The processor 130 may compare the representative pixel values of the pixel blocks with one another, and determine whether pixel blocks having pixel values falling within a similar range are continuously arranged. In response to the pixel blocks being continuously arranged, the processor 130 may determine that those pixel blocks form a single object. The processor 130 may determine whether there exists an object having pixel values falling within a range similar to person's skin from among the pixel blocks determined to be the objects. In response to such an object existing, the processor 130 may recognize the object as a user's face area or other body areas, and determine the other objects as a background.

The processor 130 may crop a part 910 of the live view to correspond to the size of the sub display area 20, and control the display 110 to display the part 910 on the sub display area 20. In particular, the processor 130 may crop the part 910 of the live view while maintain the aspect ratio of the sub display area 20. The processor 130 may crop the part 910 of the live view such that the face area included in the live view is located on the center of the sub display area 20. In addition, the processor 130 may crop an area smaller than the part 910 of the live view shown in FIG. 9, and may magnify the cropped area and display the area on the sub display area 20.

In response to the live view being recognized as including people' faces, the processor 130 may display the closest person's face area to the user from among the people' faces on the sub display area 20. In addition, the processor 130 may display a face area of a person who keeps his/her eyes toward the user terminal apparatus 100 from among the people's faces on the sub display area 20. In addition, the processor 130 may crop a part of the live view to show all peoples. In response to the live view including many people, the processor 130 may display the live view on the sub display area 20 without cropping. Accordingly, the user who photographs using the user terminal apparatus 100 may identify an image to be photographed through the live view displayed on the main display area 10, and people who are photographed may identify an image to be photographed through a part of the live view which is cropped and displayed on the sub display area 20.

In FIG. 9, the operation of displaying the live view on both the main display area 10 and the sub display area 20 has been described. However, this should not be considered as limiting. For example, in response to the user terminal apparatus 100 being operated in a selfie photographing mode, the processor 130 may display the live view on the sub display area 20 and may display a UI informing that selfie photographing is in progress on the main display area 10.

Figure 10:
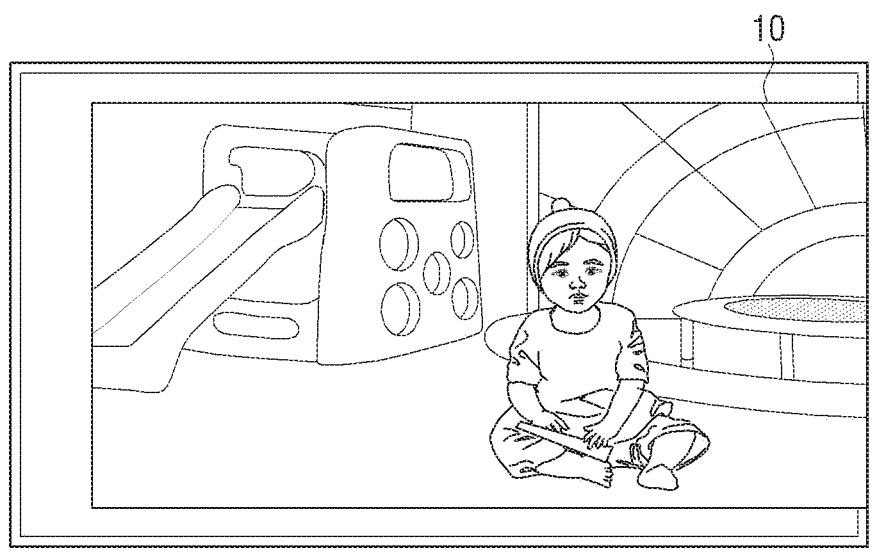
FIG. 10 illustrates a method for displaying a live view on a main display area and displaying a specific content on a sub display area according to an embodiment of the present disclosure.
Figure 10:
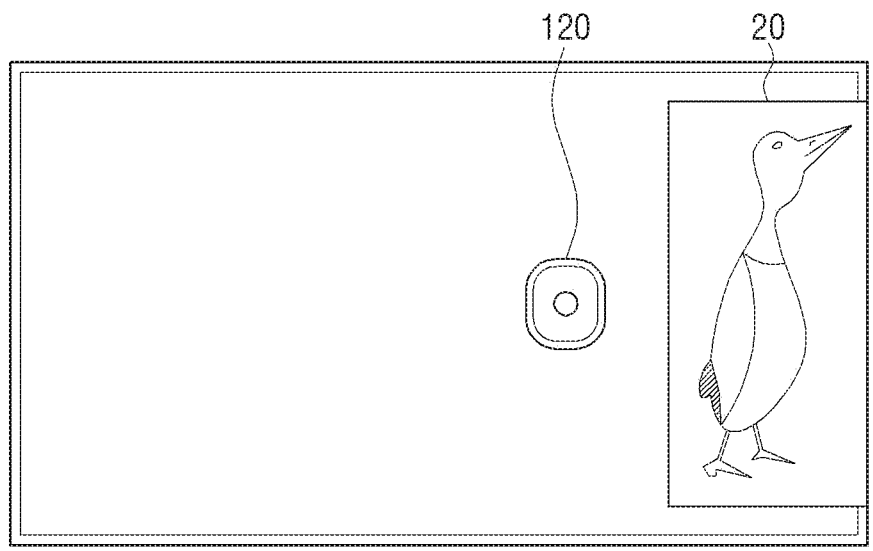

FIG. 10 illustrates a method of displaying a live view on a main display area and displaying a specific content on a sub display area according to an embodiment of the present disclosure.

Referring to FIG. 10, the processor 130 may display a live view on the main display area 10, and, in response to the live view being recognized as including a person, the processor 130 may control the display 110 to display an animation on the sub display area 20. For example, in response to a child being recognized in the live view, the processor 130 may display an animation for children or an animal image on the sub display area 20. The processor 130 may output a sound corresponding to the content displayed on the sub display area 20. Accordingly, the eyes of the person who is photographed may be kept toward the user terminal apparatus 100.

The processor 130 may determine a content to be displayed on the sub display area 20 based on at least one of age and sex of a person who is recognized in the live view. For example, in response to a woman being recognized in the live view, the processor 130 may display jewelry, and the like, on the sub display area 20.

In response to people being recognized in the live view, the processor 130 may determine a content to be displayed on the sub display area 20 with reference to the closest person from among the people. In addition, the processor 130 may determine a content to be displayed on the sub display area 20 with reference to a person who keeps his/her eyes on other direction rather than toward the user terminal apparatus 100. In addition, the processor 130 may determine a content to be displayed on the sub display area 20 with reference to a person which is located closest to the center of the live view.

In FIGS. 9 and 10, the case in which a person or person's face is recognized in the live view has been described. However, this should not be considered as limiting. For example, even in response to an animal being recognized in the live view, the processor 130 may display a part of the live view, an animation, and the like, on the sub display area 20. In addition, the processor 130 may display a part of the live view, an animation, and the like, on the sub display area 20 according to user's manipulation.

Figure 11A:
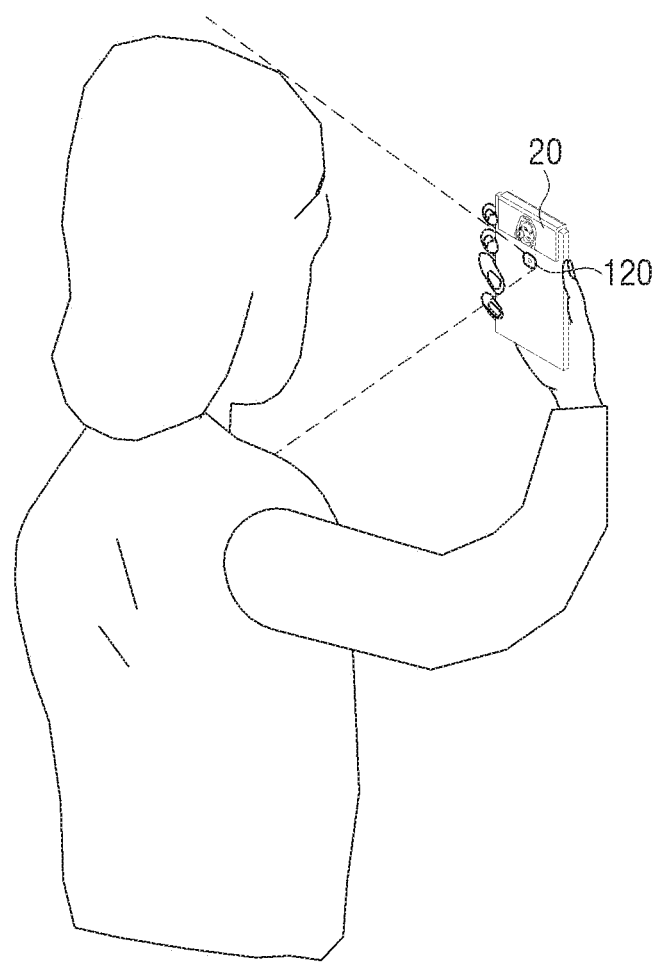
FIGS. 11A and 11B illustrate an example of a method for determining an area to display a live view according to various embodiments of the present disclosure.
Figure 11B:
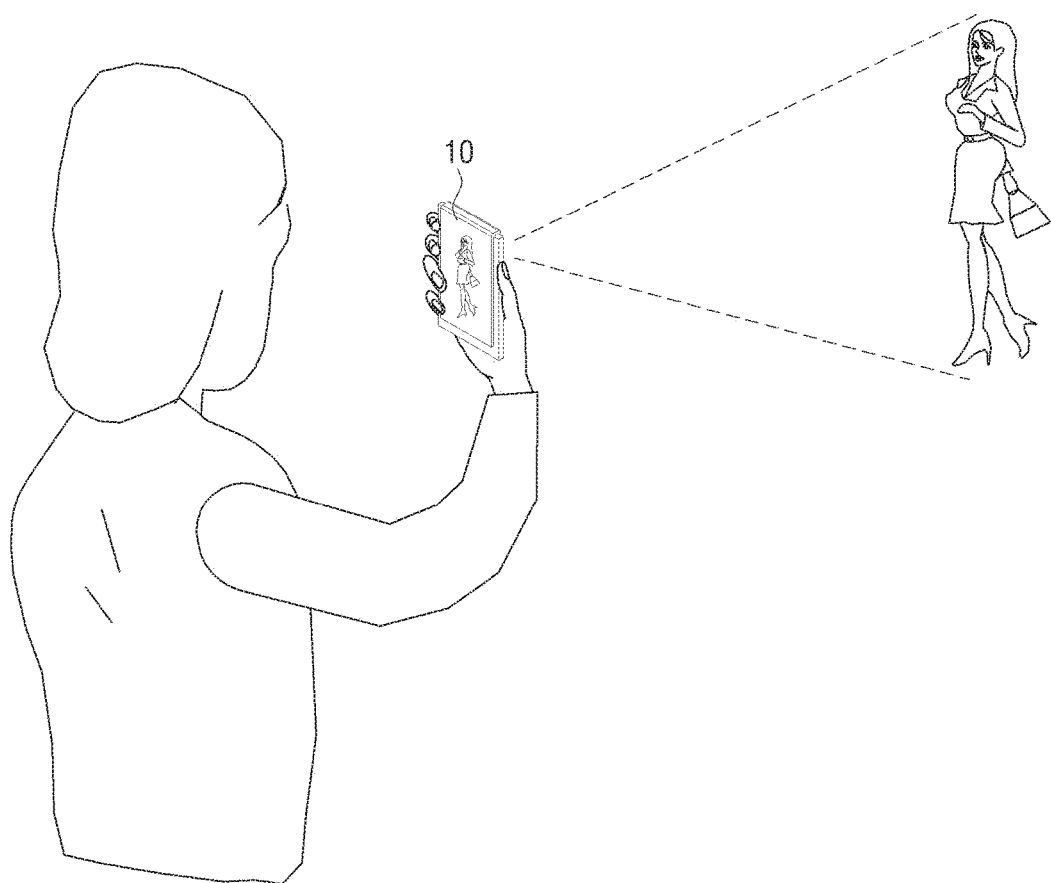

FIGS. 11A and 11B illustrate an example of a method of determining an area to display a live view according to various embodiments of the present disclosure. The processor 130 may determine a distance to a subject, and, in response to the determined distance being shorter than a predetermined distance, the processor 130 may control the display 110 to display the live view on the sub display area 20, and, in response to the determined distance being longer than the predetermined distance, control the display 110 to display the live view on the main display area 10.

Referring to FIGS. 11A and 11B, a case in which a distance to a subject is shorter than the predetermined distance is illustrated in FIG. 11A, and a case in which a distance to a subject is longer than the predetermined distance is illustrated in FIG. 11B. The processor 130 may determine the distance to the subject using auto focusing. In addition, the processor 130 may analyze a still image at a specific point of time of the live view, and determine the distance to the subject based on an outline of the subject. Accordingly, in response to the user photographing himself/herself while viewing the rear surface of the user terminal apparatus 100, the live view may be displayed on the sub display area 20 so that the user may photograph while checking an image to be photographed. In addition, in response to the user photographing other people or a scene while viewing the front surface of the user terminal apparatus 100, the live view may be displayed on the main display area 10, so that the user may photograph while checking an image to be photographed.

However, this should not be considered as limiting. The processor 130 may display the live view on the opposite area to the area determined in the above-described method or may display the live view on both the main display area 10 and the sub display area 20.

In addition, the processor 130 may display the live view on an area where a user's touch is performed.

In addition, the processor 130 may determine the area to display the live view by analyzing an image photographed by the camera 120. For example, the processor 130 may recognize the user from the photographed image and determine the area to display the live view.

In addition, the processor 130 may determine the area to display the live view by recognizing user's iris.

Figure 12:
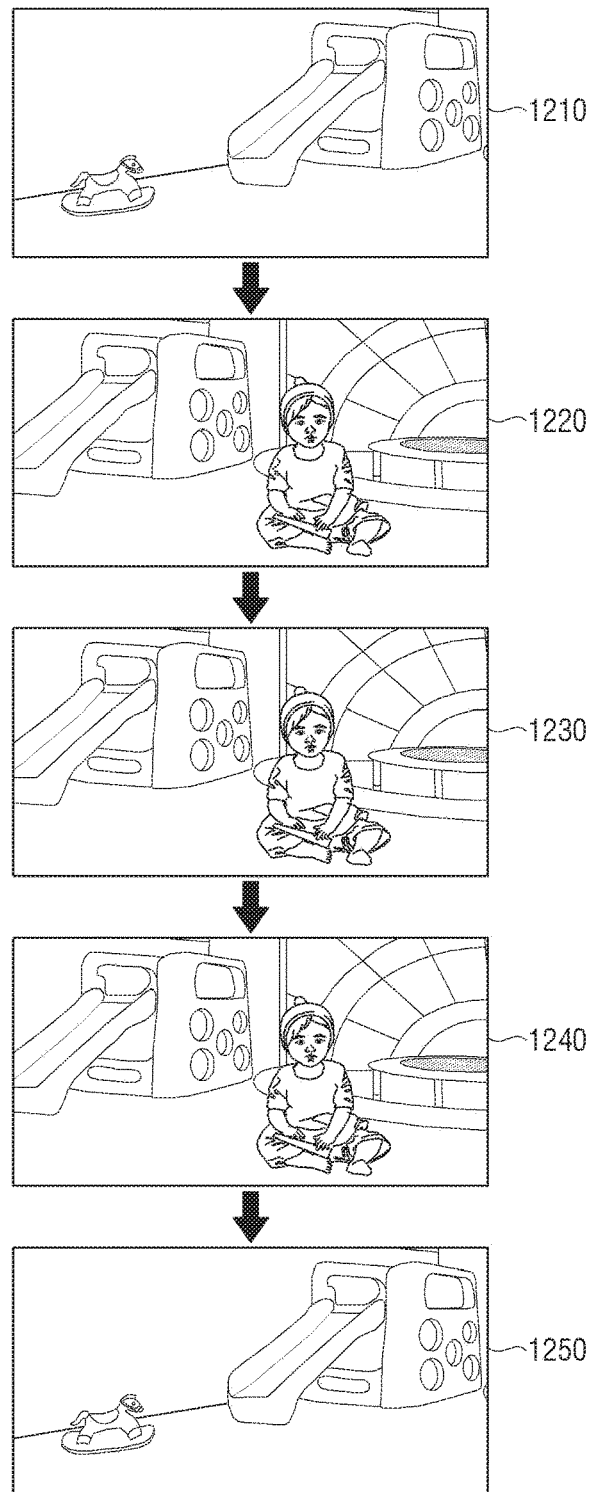
FIG. 12 illustrates a method for detecting a change in an orientation of a user terminal apparatus according to an embodiment of the present disclosure.

FIG. 12 illustrates a method of detecting a change in an orientation of a user terminal apparatus according to an embodiment of the present disclosure.

Referring to FIG. 12, in response to an orientation of the user terminal apparatus 100 being changed, an image of a live view may be changed. The user terminal apparatus 100 may include a plurality of sensors as described above. The processor 130 may determine whether the orientation of the user terminal apparatus 100 is changed based on at least one of a location and a motion of the user terminal apparatus 100 and a user's grip, which are detected by the plurality of sensors. For example, the processor 130 may determine whether the orientation of the user terminal apparatus 100 is changed based on a rotation state and a moving direction of the user terminal apparatus 100 detected by the geomagnetic sensor, and a rotation angle of the user terminal apparatus 100 detected by the gyro sensor.

In response to the user terminal apparatus 100 being rotated in a specific direction by more than a predetermined angle, the processor 130 may determine that the orientation of the user terminal apparatus 100 is changed. For example, in response to the user terminal apparatus 100 being rotated by more than 90°, the processor 130 may determine that the orientation of the user terminal apparatus 100 is changed and perform a corresponding operation.

In response to a person's face being greater than or equal to a predetermined size being recognized in the live view or in response to the person's face being greater than or equal to the predetermined size being recognized, but the person's face not being recognized afterward, the processor 130 may determine that the orientation of the user terminal apparatus 100 is changed. FIG. 12 illustrates a plurality of still images of a live view in sequence. The first still image 1210 is an image without a person and the second to fourth still images 1220, 1230 and 1240 are images with a person. The fifth image 1250 is an image without a person. That is, FIG. 12 illustrates that a camera angle is moved from the left to the right and then is moved back to the left.

The processor 130 may determine that the orientation of the user terminal apparatus 100 is changed at the time at which the second still image 1220 is displayed and at the time at which the fifth still image 1250 is displayed as shown in FIG. 12.

However, this should not be considered as limiting. The processor 130 may determine whether the orientation of the user terminal apparatus 100 is changed with reference to other objects rather than the person's face. For example, the processor 130 may extract an outline of a slide from a specific still image of the live view and then extract the outline of the slide from the next still image, and, in response to the outline of the slide being recognized as being moved by more than a predetermined distance on the live view, the processor 130 may determine that the orientation of the user terminal apparatus 100 is changed.

In addition, the processor 130 may continue detecting an absolute posture using various sensors provided in the user terminal apparatus 100, and determine whether the orientation of the user terminal apparatus 100 is changed.

In this case, the processor 130 may set a reference posture, and, in response to the posture being changed from the reference posture by more than a predetermined value, the processor 130 may determine that the orientation of the user terminal apparatus 100 is changed. Herein, the reference posture is a posture when a camera application is selected.

In addition, the processor 130 may determine whether the orientation of the user terminal apparatus 100 is changed according to user's touch manipulation.

Figure 13A:
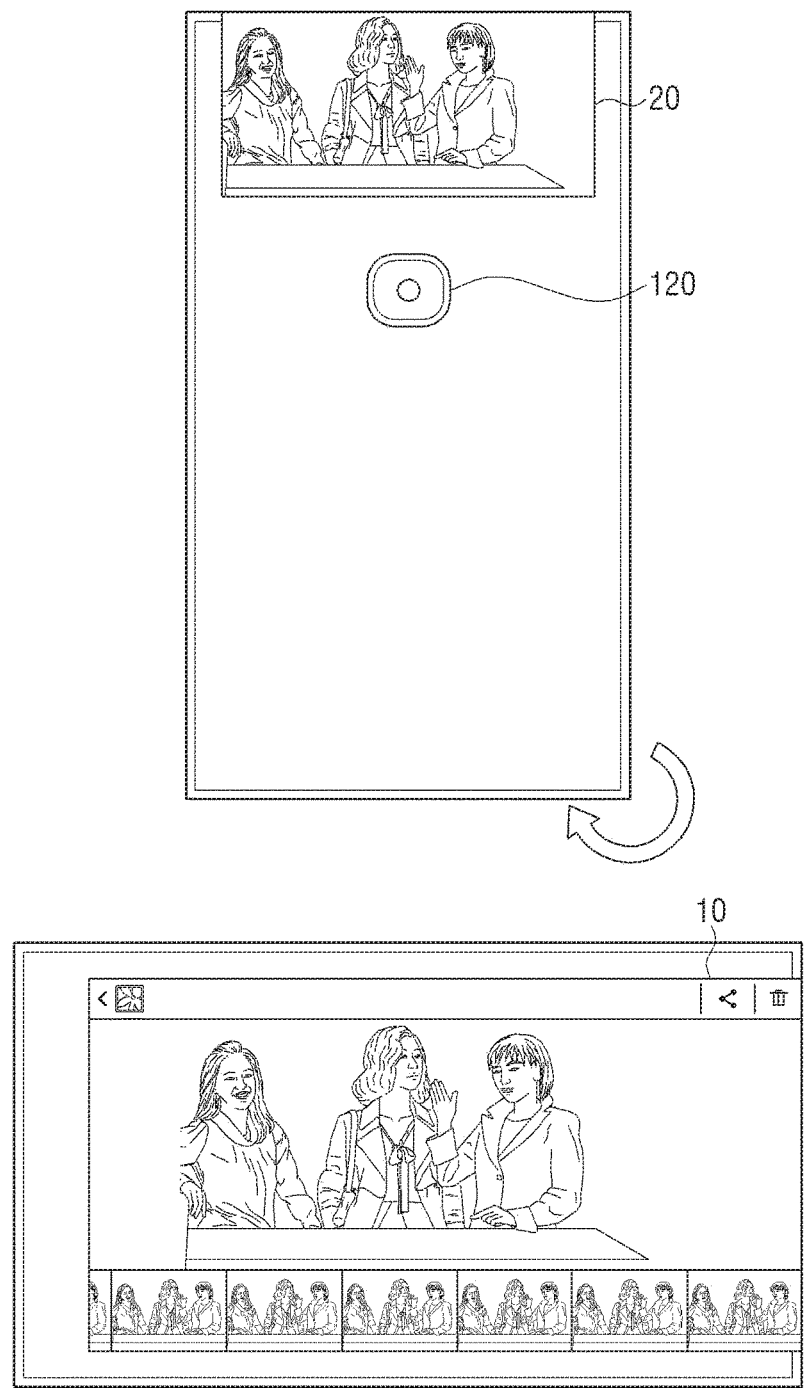
FIGS. 13A and 13B illustrate an example of an operation corresponding to a change in an orientation of a user terminal apparatus according to various embodiments of the present disclosure.
Figure 13B:
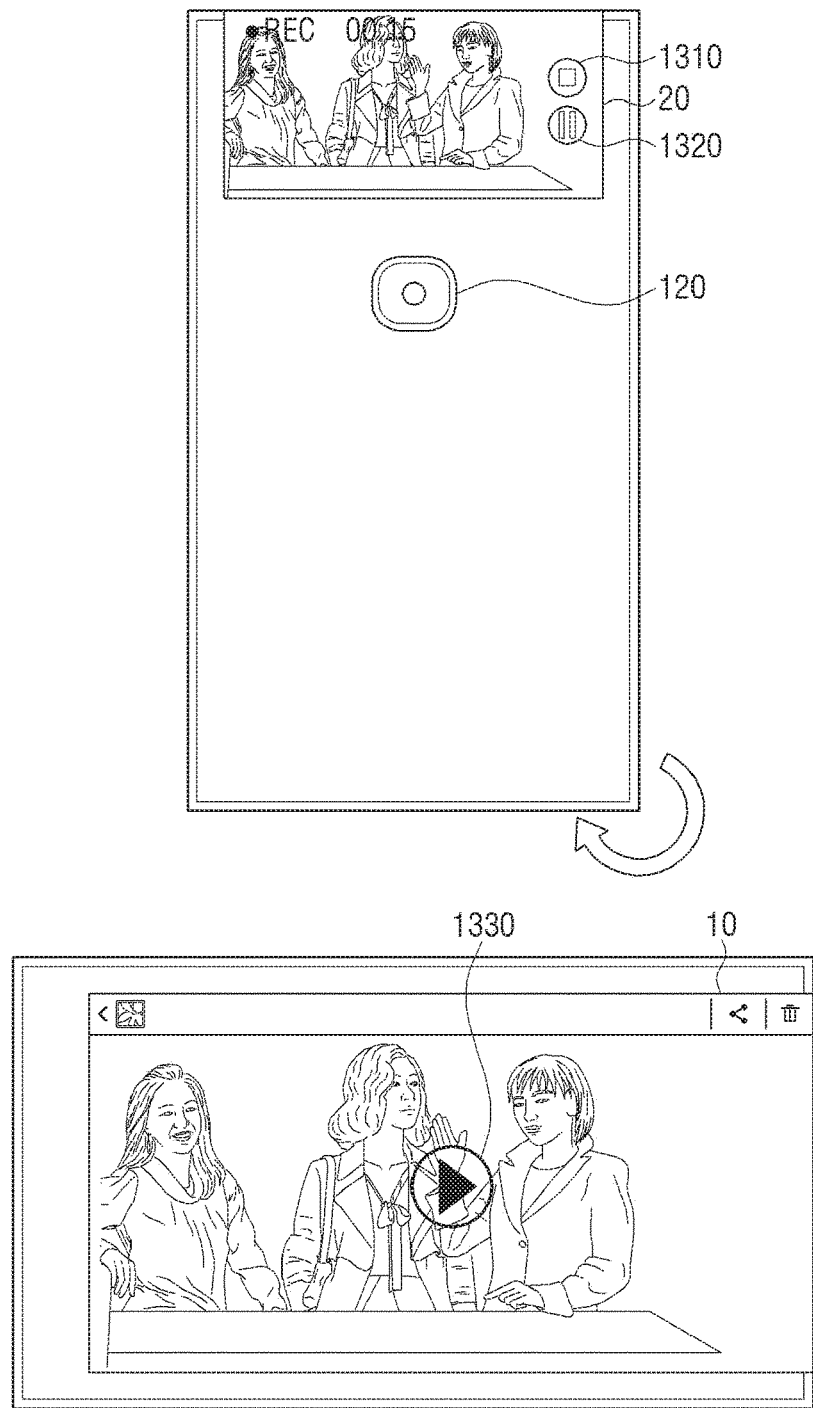

FIGS. 13A and 13B illustrate an example of an operation according to the change of an orientation of a user terminal apparatus according to various embodiments of the present disclosure.

Referring to FIG. 13A, in response to an orientation of the user terminal apparatus 100 being changed while a photographing function is being executed, a gallery application is executed. For example, the processor 130 may display a live view on the sub display area 20, and, in response to the user terminal apparatus 100 being rotated by about 180°, the processor 130 may display the gallery application on the main display area 10. In addition, the processor 130 may display a telephony function, an Internet function, and the like, unrelated to the photographing function on the main display area 10. In addition, the processor 130 may stop the photographing function.

In addition, in response to the user touching the main display area 10 in the state in which photographing is performed and a stored image is displayed on the sub display area 20, the processor 130 may display the gallery application or an application for correcting on the sub display area 20. In addition, in response to photographing being performed, the processor 130 may display the photographed images on the sub display area 20 in sequence, and, in response to the user touching the main display area 10, may change and display the image.

Referring to FIG. 13B response to the orientation of the user terminal apparatus 100 being changed while a moving picture photographing function is being executed, the moving picture photographing function is stopped. The upper view of FIG. 13B illustrates a photographing time, a GUI 1310 for stopping photographing the moving picture, and a GUI 1320 for pausing photographing the moving picture. The user may touch the GUI 1310 for stopping photographing the moving picture to stop photographing the moving picture. However, the user may change the orientation of the user terminal apparatus 100 to stop photographing the moving picture. The lower view of FIG. 13B illustrates a thumbnail image of the moving picture after photographing is finished, and the user may touch a GUI 1330 for executing the moving picture to execute the moving picture.

However, this should not be considered as limiting. The processor 130 may pause or stop photographing the moving picture in response to a touch on the main display area 10 while the moving picture is being photographed.

Figure 14A:
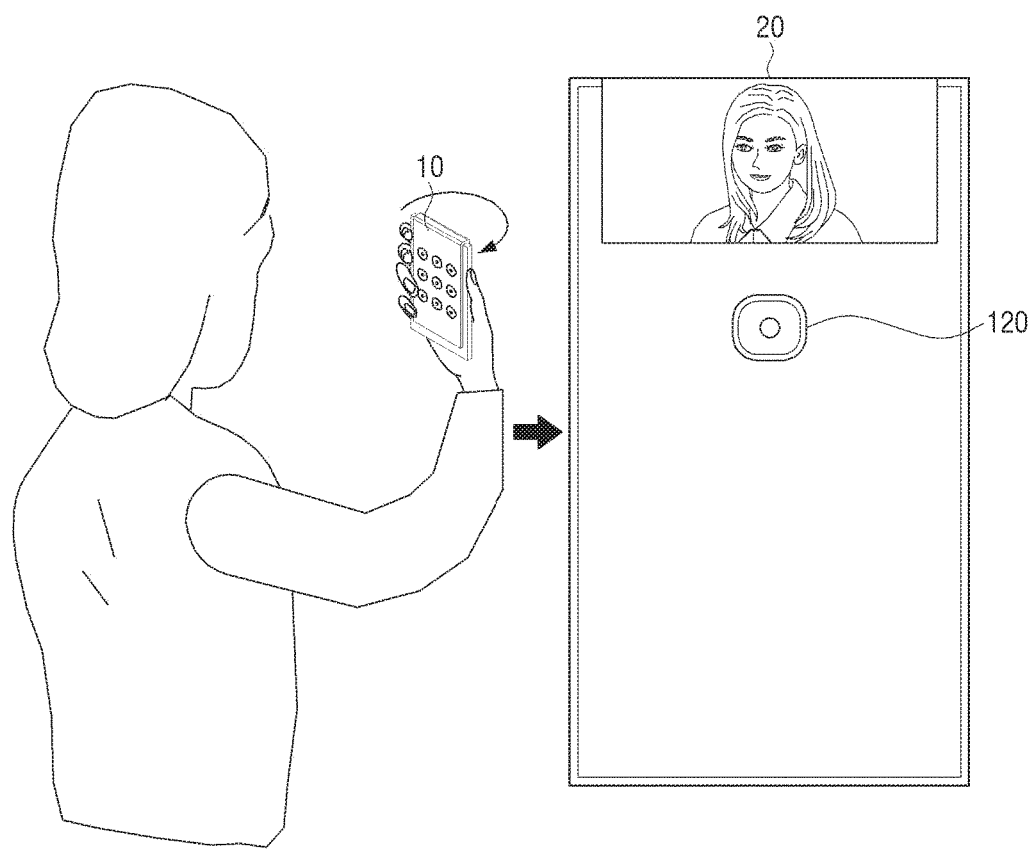
FIGS. 14A and 14B illustrate an example of a method for executing a photographing function according to various embodiments of the present disclosure.
Figure 14B:
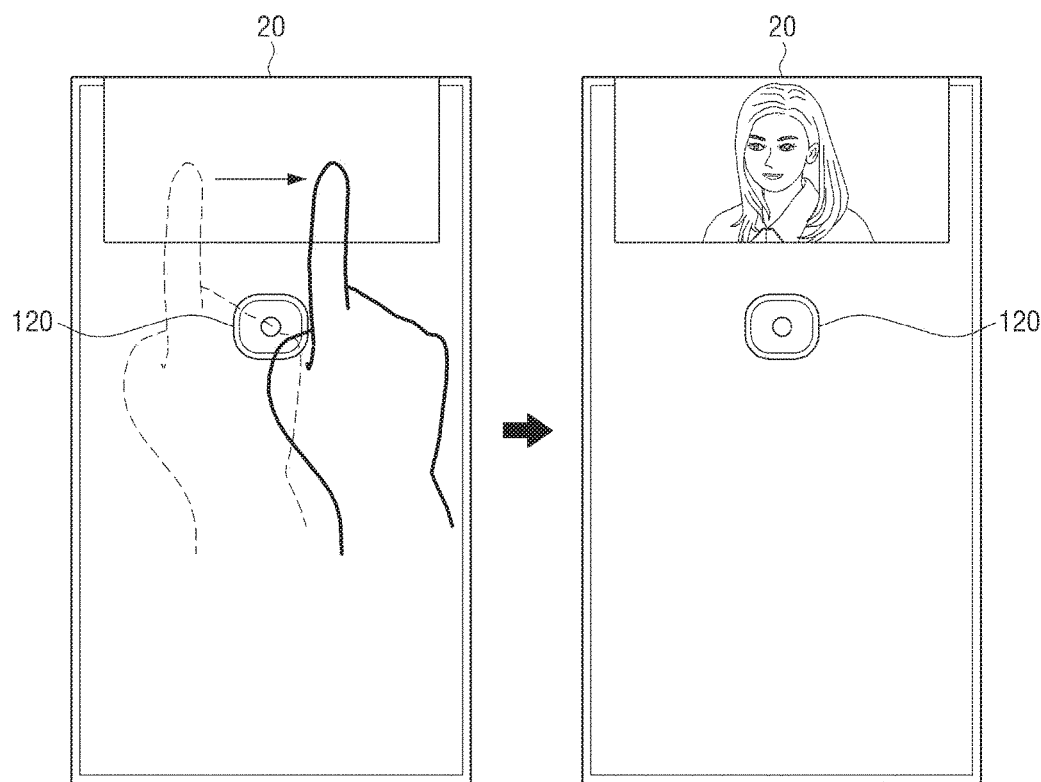

FIGS. 14A and 14B illustrate an example of a method of executing a photographing function. The processor 130 may execute the photographing function in other ways rather than by touching an icon indicating the photographing function.

Referring to FIG. 14A, in response to the orientation of the user terminal apparatus 100 being changed, the photographing function is executed. For example, in response to the orientation of the user terminal apparatus 100 being changed while a lock screen is being displayed on the main display area 10, the processor 130 may execute the photographing function and display a live view on the sub display area 20. In addition, in response to the orientation of the user terminal apparatus 100 being changed while information is not being provided on the main display area 10, the processor 130 may execute the photographing function and display a live view on the sub display area 20.

Referring to FIG. 14B, in response to a swipe interaction on the sub display area 20 being detected, the photographing function is executed. For example, in response to the swipe interaction on the sub display area 20 being detected while the lock screen is being displayed on the sub display area 20 or information is not being provided on the sub display area 20, the processor 130 may execute the photographing function. FIG. 14B illustrates the swipe interaction moving from the left to the right. However, the swipe interaction is not limited to a specific direction. In addition, the photographing function may be executed through other interactions than the swipe interaction.

The photographing function may be executed in various ways in addition to the ways in the embodiments of FIGS. 14A and 14B. For example, in response to at least one of the main display area 10 and the sub display area 20 being activated while information is not being provided on the main display area 10 and the sub display area 20, the processor 130 may recognize a user's intention and execute the photographing function. The processor 130 may recognize at least one of a user's face, a user's gesture, and a grip form at the time when a specific area is activated, and execute the photographing function. For example, in response to the user making a V sign with user's fingers, the processor 13 may execute the photographing function.

Figure 15:
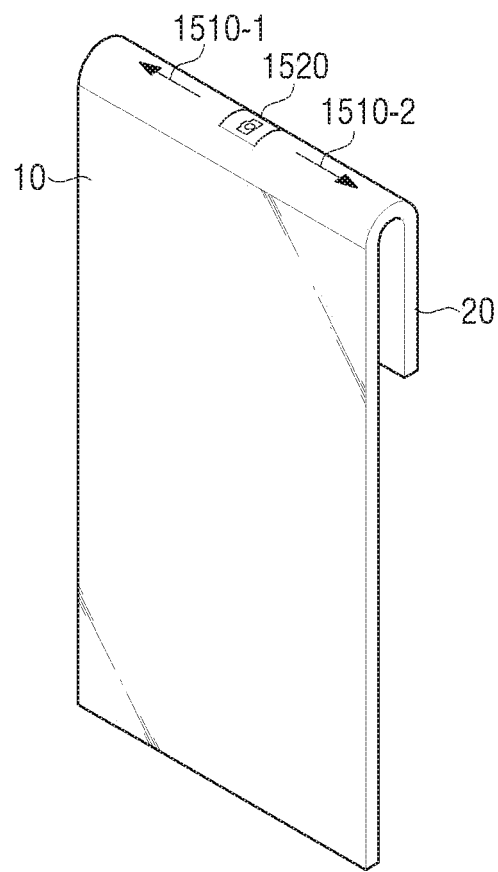
FIG. 15 illustrates a method for using the round display area according to an embodiment of the present disclosure.

FIG. 15 is a view to illustrate a method of using a round display area according to an embodiment of the present disclosure.

Referring to FIG. 15, the round display area 30 is disposed between the main display area 10 and the sub display area 20. The round display area 30 may display a UI for controlling the user terminal apparatus 100. For example, in response to the photographing function being activated, the processor 130 may display a GUI 1520 for photographing and storing an image on the round display area 30. In response to the user touching the GUI 1520 for photographing and storing the image, the processor 130 may photograph and store the image.

In response to a swipe interaction in the horizontal direction 1510-1, 1510-2 on the round display area 30 being detected, the processor 130 may change an exposure value and display a live view. In addition, the processor 130 may display the live view by zooming in or zooming out. However, this should not be considered as limiting. The processor 130 may change a focus or change white balance through a swipe interaction.

However, this should not be considered as limiting. In response to the swipe interaction on the round display area 30 being detected, the processor 130 may execute the photographing function. In addition, the processor 130 may change the area to display the live view in response to a touch on the round display area 30.

The processor 130 may display a specific notification on the round display area 30. For example, in response to a subject being out of focus, the processor 130 may display a notification to inform the corresponding situation on the round display area 30. In response to the user touching the notification, the processor 130 may change settings to focus on the subject or retry photographing.

Figure 16:
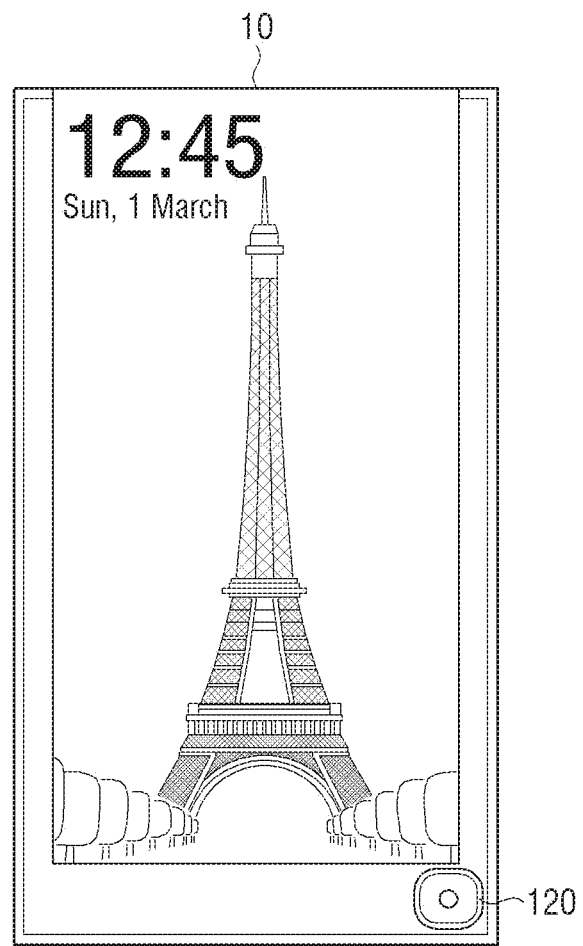
FIG. 16 illustrates a camera which is provided on a front surface of a user terminal apparatus according to an embodiment of the present disclosure.

FIG. 16 is a view to illustrate a user terminal apparatus which has a camera disposed on a front surface thereof according to an embodiment of the present disclosure.

Referring to FIG. 16, the user terminal apparatus 100 may include the camera 120 disposed under the main display area 10. However, most of the operations described in the above-described embodiments are equally applied except that the main display area 10 and the sub display area 20 are reversed. Therefore, a detailed description is omitted.

In the above descriptions, the camera application has been mainly described. However, similar operations may be performed for other applications.

Figure 17A:
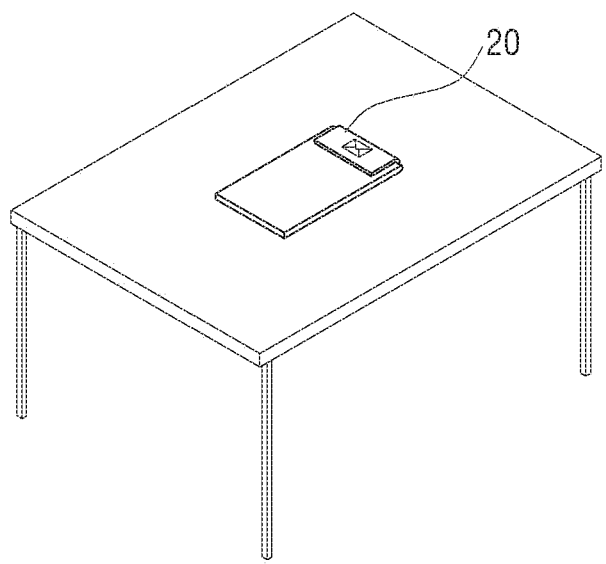
FIGS. 17A to 17C illustrate an example of a case in which other applications are used according to various embodiments of the present disclosure.
Figure 17B:
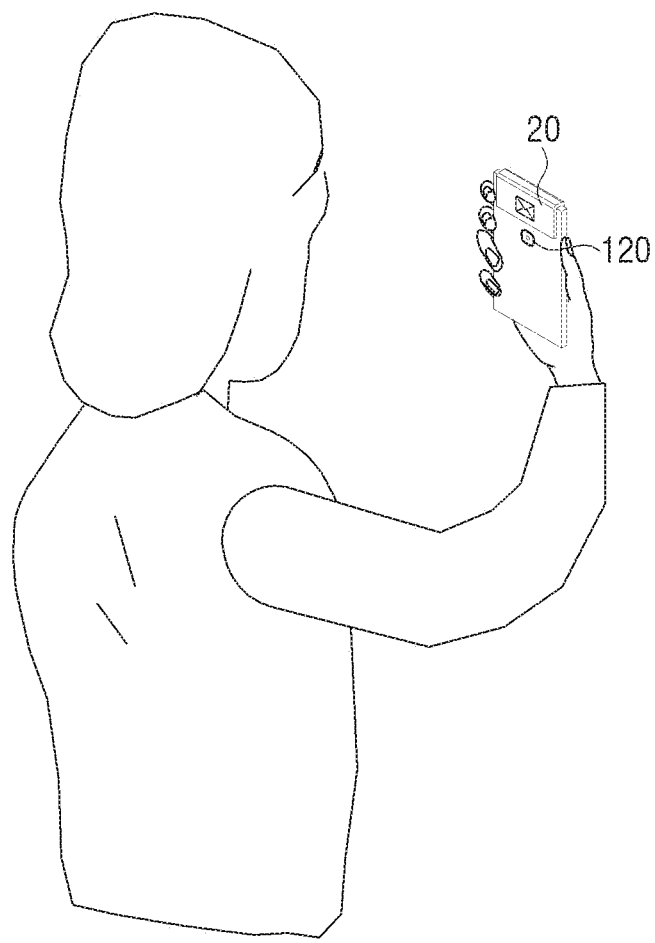
Figure 17C:
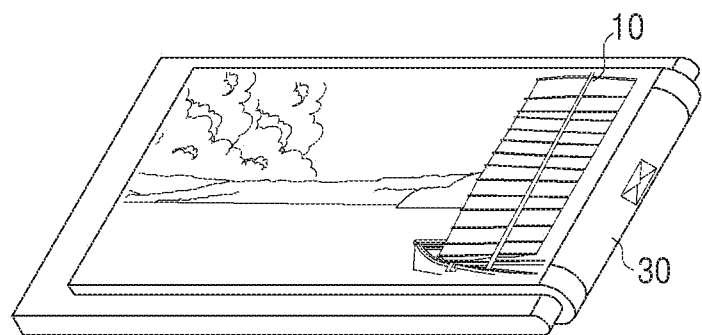

FIGS. 17A to 17C are views to illustrate an example of a case in which other applications are used according to various embodiments of the present disclosure.

Referring to FIG. 17A, in response to an event occurring, the processor 130 may determine a display area based on the orientation of the user terminal apparatus 100 at the time when the event occurs. For example, in response to a call or a message being received, the processor 130 may detect an absolute posture of the user terminal apparatus 100 at the time when the call or message is received, and display contents of the call or message on a predetermined display area. In particular, in response to the main display area 10 being in contact with a table, the processor 130 may display the contents of the call or message on the sub display area 20.

In addition, referring to FIG. 17B, in response to an event occurring, the processor 130 may determine a display area based on a user's location at the time when the event occurs. For example, in response to a call or a message being received, the processor 130 may recognize the user's location at the time when the call or message is received through the camera 120, and, in response to the user's location being recognized, the processor 130 may display the contents of the call or message on the sub display area 20, and, in response to the user's location not being recognized, the processor 130 may display the contents of the call or message on the main display area 10.

In addition, referring to FIG. 17C, in response to an event occurring, the processor 130 may determine a display area based on a using state of the user terminal apparatus 100 at the time when the event occurs. For example, in response to a call or a message being received while the user is viewing a moving picture through the main display area 10, the processor 130 may display the contents of the call or message on the sub display area 20 or the round display area 30.

In response to the orientation of the user terminal apparatus 100 being changed, the processor 130 may change a display area. For example, in response to the user changing the orientation of the user terminal apparatus 100 in the middle of viewing contents of a text message through the main display area 10, and then viewing the sub display area 20, the processor 130 may display the contents of the text message on the sub display area 20.

As described above, the processor 130 may determine whether the orientation of the user terminal apparatus 100 is changed using various sensors or the camera 120. The change of the orientation of the user terminal apparatus 100 has been described in detail and thus a redundant explanation thereof is omitted.

In response to the orientation of the user terminal apparatus 100 being changed and thus the display area being changed, the processor 130 may change a UI. Specifically, the processor 130 may change at least one of an amount of information, an information type, and a layout included in the UI. For example, in response to a text message being displayed on the main display area 10, the processor 130 may additionally display a UI for creating a new text message, information on the other user, and the like, in addition to the contents of the text message. In addition, in response to the text message being displayed on the sub display area 20, only the contents of the text message may be displayed. In addition, in response to the text message being displayed on the round display area 30, the processor 130 may display some contents of the text message in sequence.

In particular, the processor 130 may change a function to provide according to a display area. For example, in response to the received text message being displayed on the main display area 10, the processor 130 may display a UI including a reply message input function, a received message storing function, a received message deleting function, and the like. However, in response to the received text message being displayed on the round display area 30, only the contents of the received text message may be displayed and other functions may not be provided.

Figure 18A:
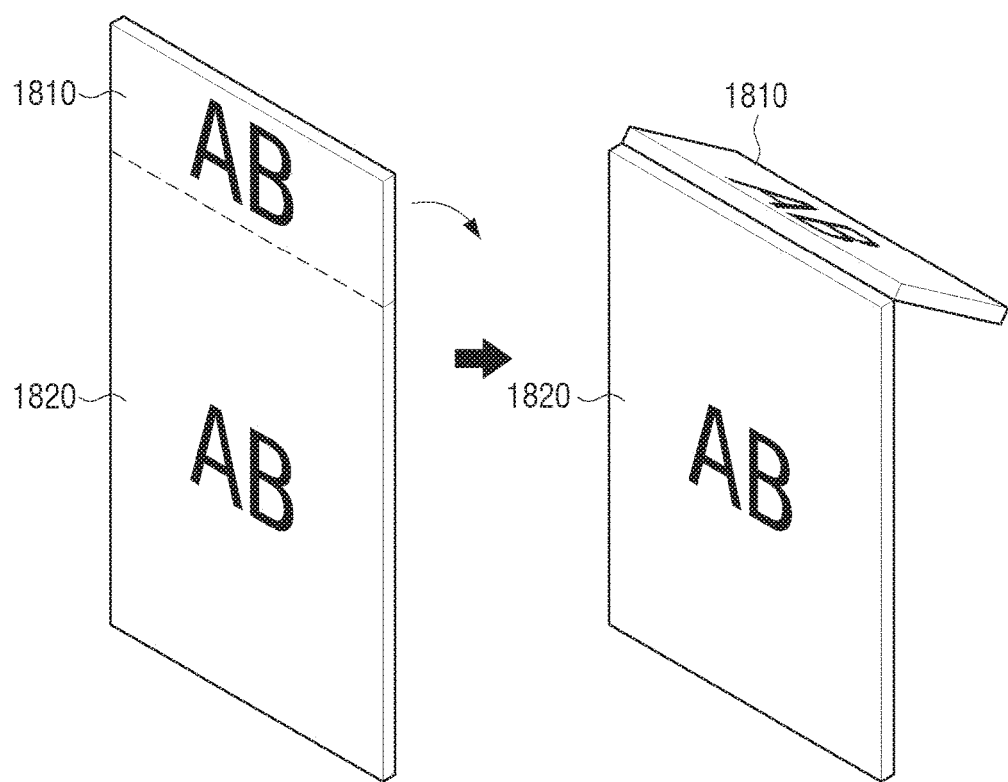
FIGS. 18A and 18B illustrate an example of a configuration of a display according to various embodiments of the present disclosure.
Figure 18B:
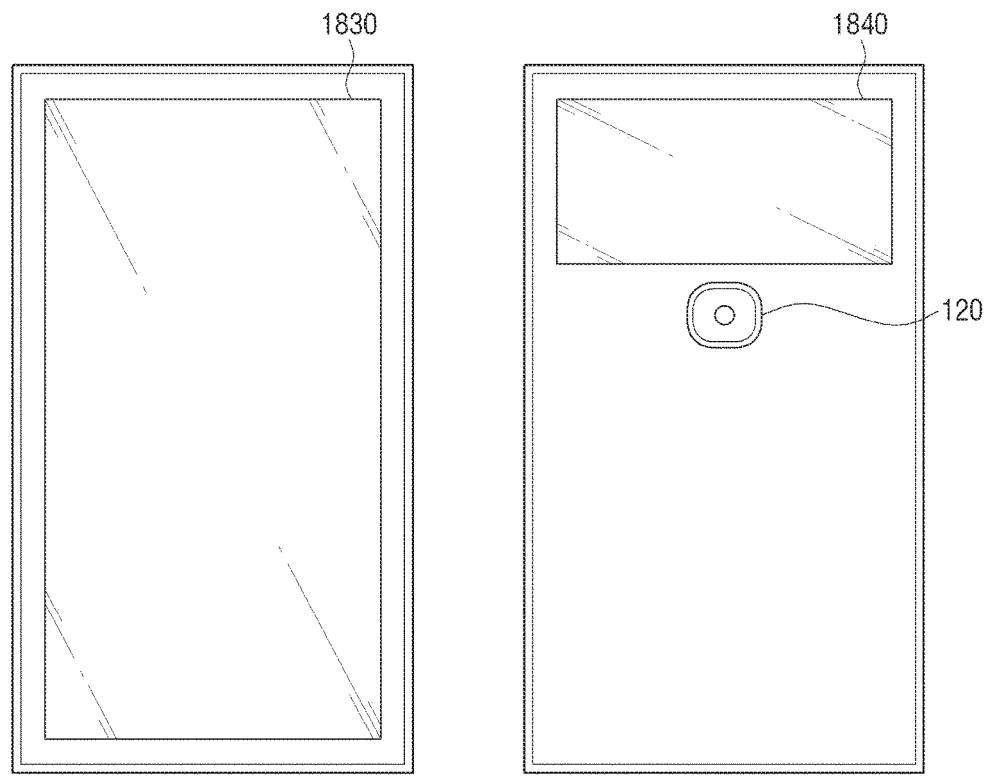

FIGS. 18A and 18B illustrate an example of a configuration of a display according to various embodiments of the present disclosure.

Referring to FIG. 18A, a flexible display is illustrated. The user may fold the flexible display and use the same. In this case, an area 1810 which is folded and bent back corresponds to the sub display area 20, and an unfolded area 1820 corresponds to the main display area 10.

In FIG. 18A, the folded area 1810 is smaller than the unfolded area 1820. However, this should not be considered as limiting. For example, the user may fold the flexible display in half and use the same.

Most of the embodiments described above may be applied to the flexible display except for the round display area 30, and a redundant explanation is omitted. However, the round display area 30 may be formed by folding the flexible display two times. In this case, the embodiments of the round display area 30 may be applied.

Referring to FIG. 18B, the user terminal apparatus 100 which is provided with a plurality of displays on the front surface and the rear surface thereof is illustrated. In this case, a front display 1830 corresponds to the main display area 10, and a rear display 1840 corresponds to the sub display area 20. Likewise, most of the embodiments described above be applied to the user terminal apparatus 100 having the plurality of displays disposed on the front surface and the rear surface thereof except for the round display area 30, and a redundant explanation is omitted.

Figure 19:
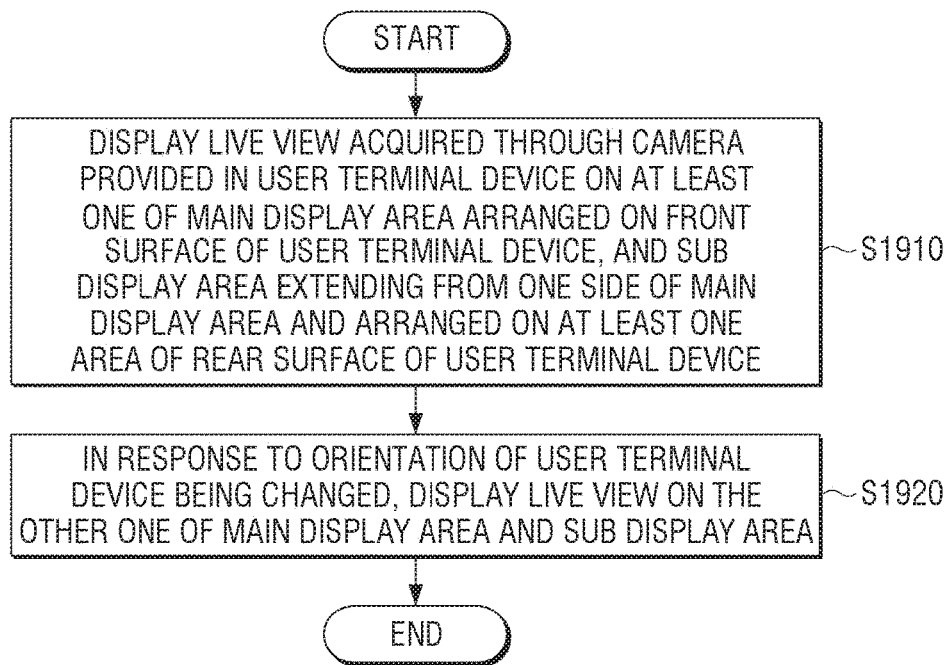
FIG. 19 is a flowchart to illustrate a control method of a user terminal apparatus according to an embodiment of the present disclosure.

FIG. 19 is a flowchart to illustrate a control method of the user terminal apparatus according to an embodiment of the present disclosure.

Referring to FIG. 19, first, the user terminal apparatus 100 displays a live view acquired through a camera on one of a main display area which is disposed on the front surface of the user terminal apparatus, and a sub display area which extends from one side of the main display area and is disposed on at least one area of the rear surface of the user terminal apparatus 100 at operation S1910. In addition, in response to the orientation of the user terminal apparatus 100 being changed, the user terminal apparatus 100 displays the live view on the other one of the main display area and the sub display area at operation S1920.

The displaying on one of the main display area and the sub display area at operation S1910 may include displaying the live view on the main display area and not providing information on the sub display area, and the displaying on the other one of the main display area and the sub display area at operation S1920 may include, in response to the orientation of the user terminal apparatus being changed, displaying the live view on the sub display area and not providing information on the main display area.

The displaying on the other one of the main display area and the sub display area at operation S1920 may include: displaying the live view on the sub display area and not providing information on the main display area; and may further include, in response to a user touch on the main display area being detected, include photographing and storing an image.

The control method may further include, in response to a swipe interaction from a certain point in the main display area in a predetermined direction being detected, changing a photographing setting value to correspond to the predetermined direction.

The displaying on the other one of the main display area and the sub display area at operation S1920 may further include: displaying the live view on the main display area; and, in response to the live view being recognized as including a person's face, displaying a face area included in the live view on the sub display area.

The displaying on the sub display area may include cropping a part of the live view to correspond to a size of the sub display area, and displaying the part on the sub display area.

The displaying on the other one of the main display area and the sub display area at operation S1920 may further include: displaying the live view on the main display area; and, in response to the live view being recognized as including a person, displaying an animation on the sub display area.

The displaying on one of the main display area and the sub display area at operation S1910 may include: determining a distance to a subject, and, in response to the determined distance being shorter than a predetermined distance, displaying the live view on the sub display area, and, in response to the determined distance being longer than the predetermined distance, displaying the live view on the main display area.

The control method may further include detecting at least one of a location and a motion of the user terminal apparatus, and a user's grip, and the displaying on the other one of the main display area and the sub display area at operation S1920 may include determining whether the orientation of the user terminal apparatus is changed based on at least one of the location and the motion of the user terminal apparatus, and the user's grip.

The displaying on the other one of the main display area and the sub display area at operation S1920 may include, in response to a person's face being greater than or equal to a predetermined size being recognized in the live view, or in response to the person's face being greater than or equal to the predetermined size being recognized and then the person's face not being recognized, determining that the orientation of the user terminal apparatus is changed.

According to various embodiments described above, the user terminal apparatus may control the displays disposed on the front surface and the rear surface of the user terminal apparatus based on various photographing conditions, so that the user may easily photograph.

In the above descriptions, the control method when the photographing function is executed has been mainly explained. However, this should not be considered as limiting. For example, in response to the orientation of the user terminal apparatus being changed while a lock screen is being displayed on the main display area, the processor may execute a predetermined application. In addition, in response to the orientation of the user terminal apparatus being changed while a UI indicating receiving of a call is being displayed on the main display area, the processor may connect the call. In response to the user terminal apparatus moving further away from user's ear while the user is talking on the phone, the processor may display contacts, and the like.

In addition, the processor may display an execution state of an application which is being executed in the background on the sub display area. For example, the processor may display an execution state of a specific game or music application, and the like. on the sub display area, and thus may minimize power consumption. In addition, in response to the orientation of the user terminal apparatus being changed while a specific application is being executed and displayed on the main display area, the processor may display a UI displaying essential functions of the corresponding application on the sub display area.

In the above-described embodiments, only the orientation of the user terminal apparatus is changed. However, a different operation may be performed according to a direction of the changed orientation. For example, a different function may be executed in response to rotation of the user terminal apparatus in the upward direction, downward direction, rightward direction, or leftward direction. In addition, even in response to the user terminal apparatus being rotated in the upward direction, a different function may be executed according to whether the rotation is made in the clockwise direction or counter clockwise direction.

A control method of a user terminal apparatus, which includes: a display including a main display area which is disposed on a front surface of the user terminal apparatus, and a sub display area which extends from one side of the main display area and is disposed on at least one area of a rear surface of the user terminal apparatus; and a camera configured to photograph an image, according to the above-described embodiments may be implemented as a computer executable program code and stored in various non-transitory computer readable media, and may be provided to servers or devices to be executed by processors.

For example, a non-transitory computer readable medium which stores a program for performing the steps of in sequence: displaying a live view acquired through the camera on one of the main display area and the sub display area; and, in response to an orientation of the user terminal apparatus being changed, displaying the live view on the other one of the main display area and the sub display area may be provided.

The non-transitory computer readable medium refers to a medium that stores data semi-permanently rather than storing data for a very short time, such as a register, a cache, a memory or and the like, and is readable by an apparatus. Specifically, the above-described various applications or programs may be stored in the non-transitory computer readable medium such as a compact disc (CD), a digital versatile disc (DVD), a hard disk, a Blu-ray disc, a USB, a memory card, a ROM, and the like, and may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first touch display disposed on a first side of the electronic device;
   a second touch display disposed on a second side of the electronic device, the first side and the second side being opposite sides of the electronic device;
   a camera configured to obtain one or more images, the camera disposed on the first side of the electronic device; and
   at least one processor, operatively coupled to the first touch display, the second touch display, and the camera, configured to at least:
      provide, to the first touch display, a first screen corresponding to a live view function of a first photography mode based on a first image obtained through the camera, the first screen including a first user interface for the first photography mode,
      detect whether the electronic device is flipped,
      based on detecting that the electronic device is flipped, provide, to the second touch display, a second screen corresponding to a live view function of a second photography mode based on a second image obtained through the camera, the second screen including a second user interface for the second photography mode, the second user interface being different than the first user interface, and
      capture a third image obtained through the camera in response to a user command received through one of the first touch display or the second touch display.

2. A method of an electronic device, the method comprising:
   providing, to a first touch display of the electronic device, a first screen corresponding to a live view function of a first photography mode based on a first image obtained through a camera of the electronic device, the first touch display being disposed on a first side of the electronic device, the camera being disposed on the first side of the electronic device, the first screen including a first user interface for the first photography mode;
   detecting whether the electronic device is flipped;
   based on detecting that the electronic device is flipped, providing, to a second touch display of the electronic device, a second screen corresponding to a live view function of a second photography mode based on a second image obtained through the camera, the second touch display being disposed on a second side of the electronic device, the first side and the second side being opposite sides of the electronic device, the second screen including a second user interface for the second photography mode, the second user interface being different than the first user interface; and
   capturing a third image obtained through the camera in response to a user command received through one of the first touch display or the second touch display.

3. The electronic device of claim 1, wherein the at least one processor is further configured, while providing the live image on the second screen of the second touch display, to:
   based on detecting an additional flip of the electronic device, provide to the first touch display, the first screen corresponding to the live view function of the first photography mode based on a fourth image obtained through the camera.

4. The electronic device of claim 1, wherein the at least one processor is further configured to receive a touch input on a photography mode button displayed on one of the first touch display or the second touch display.

5. The electronic device of claim 1, wherein the first image is only provided on the first screen and the second image is only provided on the second screen.

6. The electronic device of claim 1, further comprising:
   another camera disposed on the second side of the electronic device with the second touch display.

7. The electronic device of claim 1, wherein the at least one processor, to capture the third image, is further configured to capture the third image in response to a touch input on an image capture button provided on one of the first touch display or the second touch display.

8. The method of claim 2, wherein, while providing the live view image on the second screen of the second touch display, based on detecting an additional flip of the electronic device, providing to the first touch display, the first screen corresponding to the live view function of the first photography mode based on a fourth image obtained through the camera.

9. The method of claim 2, further comprising:
receiving a touch input on a photography mode button displayed on one of the first touch display or the second touch display.

10. The method of claim 2, wherein the first image is only provided on the first screen and the second image is only provided on the second screen.

11. The method of claim 2, wherein another camera is disposed on the second side of the electronic device with the second touch display.

12. The method of claim 2, wherein the user command received through one of the first touch display or the second touch display is received as a touch input on an image capture button provided on one of the first touch display or the second touch display.

13. An electronic device comprising:
a first display disposed on a first side of the electronic device;
a second display disposed on a second side of the electronic device, the first side and the second side being opposite sides of the electronic device;
a camera of the electronic device configured to obtain an image, the camera being disposed on the first side of the electronic device; and
at least one processor, operatively coupled to the first display, the second display, and the camera, configured to at least:
detect whether the electronic device is flipped,
detect, in response to detecting the electronic device is flipped, a distance of a subject of a live image received by the camera,
based on detecting that the electronic device is flipped and the subject is within a predetermined distance of the electronic device, change a photography mode of the electronic device to a selfie mode, and
based on detecting that the electronic device is flipped and the subject is beyond the predetermined distance of the electronic device, change the photography mode of the electronic device to a background mode.

14. The electronic device of claim 13, wherein, based on the photography mode of the electronic device being the selfie mode, the at least one processor is further configured to correct a hue of the subject's skin in an image received from the camera.

15. The electronic device of claim 13, wherein, based on the photography mode of the electronic device being the background mode, the at least one processor is further configured to adjust a contrast and white balance of an image received from the camera.

16. The electronic device of claim 13, wherein, based on the photography mode of the electronic device being the selfie mode, the at least one processor is further configured to provide to the first display, a first screen corresponding to the live image based on the image obtained through the camera.

17. The electronic device of claim 13, wherein, based on the photography mode of the electronic device being the background mode, the at least one processor is further configured to provide to the second display, a second screen corresponding to the live image based on the image obtained through the camera.

18. The electronic device of claim 1, wherein the first photography mode is the selfie photography mode and the second photography mode is different than the first photography mode.

19. The electronic device of claim 1, wherein the camera is oriented in a same direction as a view in the first screen when operating in the first photography mode, and the camera is oriented in an opposite direction of a view in the second screen when operating in the second photography mode.

20. The electronic device of claim 1, wherein, while providing the first screen corresponding to the live view function of the first photography mode, the at least one processor is further configured to correct a hue of a subject's skin in the first image obtained through the camera.

21. The electronic device of claim 1, wherein, while providing the second screen corresponding to the live view function of the second photography mode, the at least one processor is further configured to adjust a contrast and white balance of the second image obtained through the camera.

22. The method of claim 2, wherein the first photography mode is the selfie photography mode and the second photography mode is different than the first photography mode.

23. The method of claim 2, wherein the camera is oriented in a same direction as a view in the first screen when operating in the first photography mode, and the camera is oriented in an opposite direction of a view in the second screen when operating in the second photography mode.

24. The method of claim 2, wherein the providing of the first screen corresponding to the live view function of the first photography mode comprises correcting a hue of a subject's skin in the first image obtained through the camera.

25. The method of claim 2, wherein the providing of the second screen corresponding to the live view function of the second photography mode comprises adjusting a contrast and white balance of the second image obtained through the camera.

* * * * *